United States Patent
Gutson et al.

(10) Patent No.: US 10,635,823 B2
(45) Date of Patent: Apr. 28, 2020

(54) COMPILING TECHNIQUES FOR HARDENING SOFTWARE PROGRAMS AGAINST BRANCHING PROGRAMMING EXPLOITS

(71) Applicant: Intel Corporation, Santa Clara, CA (US)

(72) Inventors: Daniel Fernando Gutson, Cordova (AR); Vadim Sukhomlinov, Santa Clara, CA (US); Dmitry Yurievich Babokin, Santa Clara, CA (US); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 15/870,011

(22) Filed: Jan. 12, 2018

(65) Prior Publication Data

US 2019/0042760 A1   Feb. 7, 2019

(51) Int. Cl.
*G06F 21/57* (2013.01)
*G06F 8/41* (2018.01)
*G06F 21/54* (2013.01)
*G06F 9/30* (2018.01)

(52) U.S. Cl.
CPC .............. *G06F 21/577* (2013.01); *G06F 8/41* (2013.01); *G06F 21/54* (2013.01); *G06F 8/44* (2013.01); *G06F 9/3012* (2013.01); *G06F 9/30145* (2013.01); *G06F 2221/033* (2013.01)

(58) Field of Classification Search
CPC .......................... G06F 21/577; G06F 9/30145
See application file for complete search history.

(56) References Cited

U.S. PATENT DOCUMENTS

| | | | | |
|---|---|---|---|---|
| 8,151,083 | B2 * | 4/2012 | Greiner | G06F 12/10 711/203 |
| 8,997,218 | B2 * | 3/2015 | Hentunen | G06F 21/54 726/22 |
| 9,058,492 | B1 * | 6/2015 | Satish | G06F 21/50 |
| 9,811,321 | B1 * | 11/2017 | Karppanen | G06F 16/137 |

(Continued)

OTHER PUBLICATIONS

"80x86 Instructions by opcode", accessed at: http://www.c-jump.com/CIS77/reference/Instructions_by_Opcode.html on Jan. 2, 2018, 14 pages.

(Continued)

*Primary Examiner* — Lynn D Feild
*Assistant Examiner* — Viral S Lakhia
(74) *Attorney, Agent, or Firm* — Alliance IP, LLC

(57) ABSTRACT

Technologies are provided in embodiments for using compiling techniques to harden software programs from branching exploits. One example includes program instructions for execution to obtain a first encoded instruction of a software program, the first encoded instruction including a first opcode in a first field to be performed when the first encoded instruction is executed, identify a vulnerable value in a second field within the first encoded instruction, where the vulnerable value includes a second opcode, determine that the first encoded instruction can be replaced with one or more alternative encoded instructions that do not contain the vulnerable value, and replace the first encoded instruction with the one or more alternative encoded instructions.

23 Claims, 11 Drawing Sheets

(56) References Cited

U.S. PATENT DOCUMENTS

| | | | | |
|---|---|---|---|---|
| 10,108,798 | B1* | 10/2018 | Friedman | G06F 21/56 |
| 10,423,792 | B2* | 9/2019 | Clifton | G06F 21/566 |
| 10,474,934 | B1* | 11/2019 | Cosic | G06K 9/6202 |
| 2014/0082327 | A1* | 3/2014 | Ghose | G06F 9/3877 |
| | | | | 712/205 |
| 2016/0283714 | A1* | 9/2016 | LeMay | G06F 21/56 |
| 2018/0211046 | A1* | 7/2018 | Muttik | G06F 21/577 |
| 2018/0285561 | A1* | 10/2018 | Frank | G06F 9/4843 |
| 2018/0307838 | A1* | 10/2018 | Sharma | G06F 21/54 |
| 2019/0095613 | A1* | 3/2019 | Singh | G06F 21/52 |

OTHER PUBLICATIONS

"Addressing Mode", accessed at: https://en.wikipedia.org/w/index.php?title=Addressing_mode&oldid=809287167, edited Nov. 8, 2017, 17 pages.

"Call stack", accessed at: https://en.wikipedia.org/wiki/Call_stack, last updated Dec. 4, 2017, 10 pages.

"Return-oriented programming", accessed at: https://en.wikipedia.org/wiki/Return-oriented_programming, last updated Nov. 5, 2017, 6 pages.

Bendersky, Eli, "Stack frame layout on x86-64", accessed at https://eli.thegreenplace.net/2011/09/06/stack-frame-layout-on-x86-64, last updated Sep. 6, 2011, 6 pages.

Bhat, Rashid, "Return Oriented Programming (ROP) Attacks", Infosec Institute, accessed at: http://resources.infosecinstitute.com/return-oriented-programming-rop-attacks, Oct. 9, 2012, 20 pages.

Intel Corporation, "Control-flow Enforcement Technology Preview", Revision 1.0, Jun. 2016, 136 pages.

Intel® 64 and IA-32 Architectures Software Developer's Manual, Combined vols. 1, 2A, 2B, 2C, 2D, 3A, 3B, 3C, 3D, and 4, Dec. 2017, 4810 pages.

Kholodov, Igor, "Encoding Real x86 Instructions", accessed at: http://www.c-jump.com/CIS77/CPU/x86/lecture.html on Jan. 2, 2018, 21 pages.

Maloney, David, Sr., "Return Oriented Programming (ROP) Exploits Explained", Rapid7, accessed at: https://www.rapid7.com/resources/rop-exploit-explained/, Aug. 17, 2016, 5 pages.

Patel, Baiju, "Intel Releases New Technology Specifications to Protect Against ROP attacks", Intel Software Developer Zone, accessed at: https://software.intel.com/en-us/blogs/2016/06/09/intel-release-new-technology-specifications-protect-rop-attacks on Apr. 12, 2018, last updated Jun. 9, 2016, 3 pages.

Petkov, Borislav, "x86 Instructions Encoding . . . and the nasty hacks we do in the kernel", OpenSUSE Conference, Apr. 24-28, 2014, Dubrovnik, Croatia, 63 pages.

Smith, Zack, "AntiJOP: A program to remove JOP gadgets", Revision 3, 2014, accessed at: http://zsmith.co/anitjop.html, 3 pages.

* cited by examiner

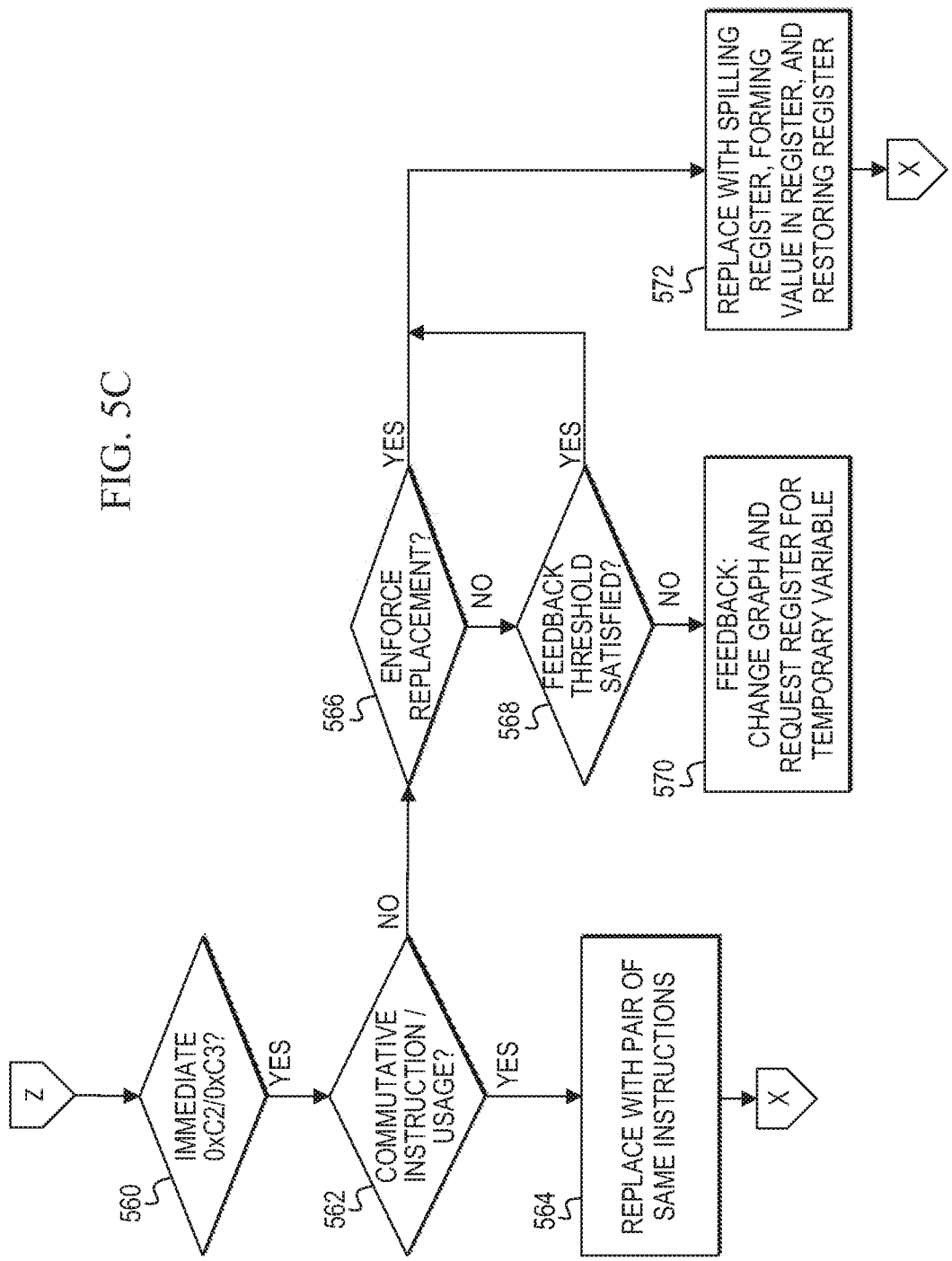

US 10,635,823 B2

COMPILING TECHNIQUES FOR HARDENING SOFTWARE PROGRAMS AGAINST BRANCHING PROGRAMMING EXPLOITS

TECHNICAL FIELD

This disclosure relates in general to the field of software security, and more particularly, to compiling techniques for hardening software programs against branch programming exploits.

BACKGROUND

The field of software security has become increasingly important in today's society. Computer systems have become intertwined in everyday life, while malicious software ('malware') that can disrupt and even prevent the use of computer systems has become increasingly more sophisticated. Various techniques for exploiting vulnerable bytes in software programs have been developed in order to cause the execution of unintentional and/or malicious operations. For example, return oriented programming (ROP) is a mainstream technique that malicious operators use to access existing code in a software program and execute the accessed code in an unintended and potentially malicious manner. To harden software and make it more reliable, certain hardware capabilities have been developed to enforce correct execution flow. For example, shadow stack and Control-Flow Enforcement Technology (CET) instructions can be used to harden new software programs to help reduce the vulnerability of certain code in the programs. Nevertheless, some vulnerabilities may escape detection and mitigation. Consequently, software developers face significant challenges in hardening software programs as malicious users continue to develop new techniques to exploit vulnerable bytes.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which:

FIGS. 5A-5C show a simplified flowchart of further potential operations associated with compiling techniques according to at least one embodiment;

DETAILED DESCRIPTION OF EMBODIMENTS

Figure 1:
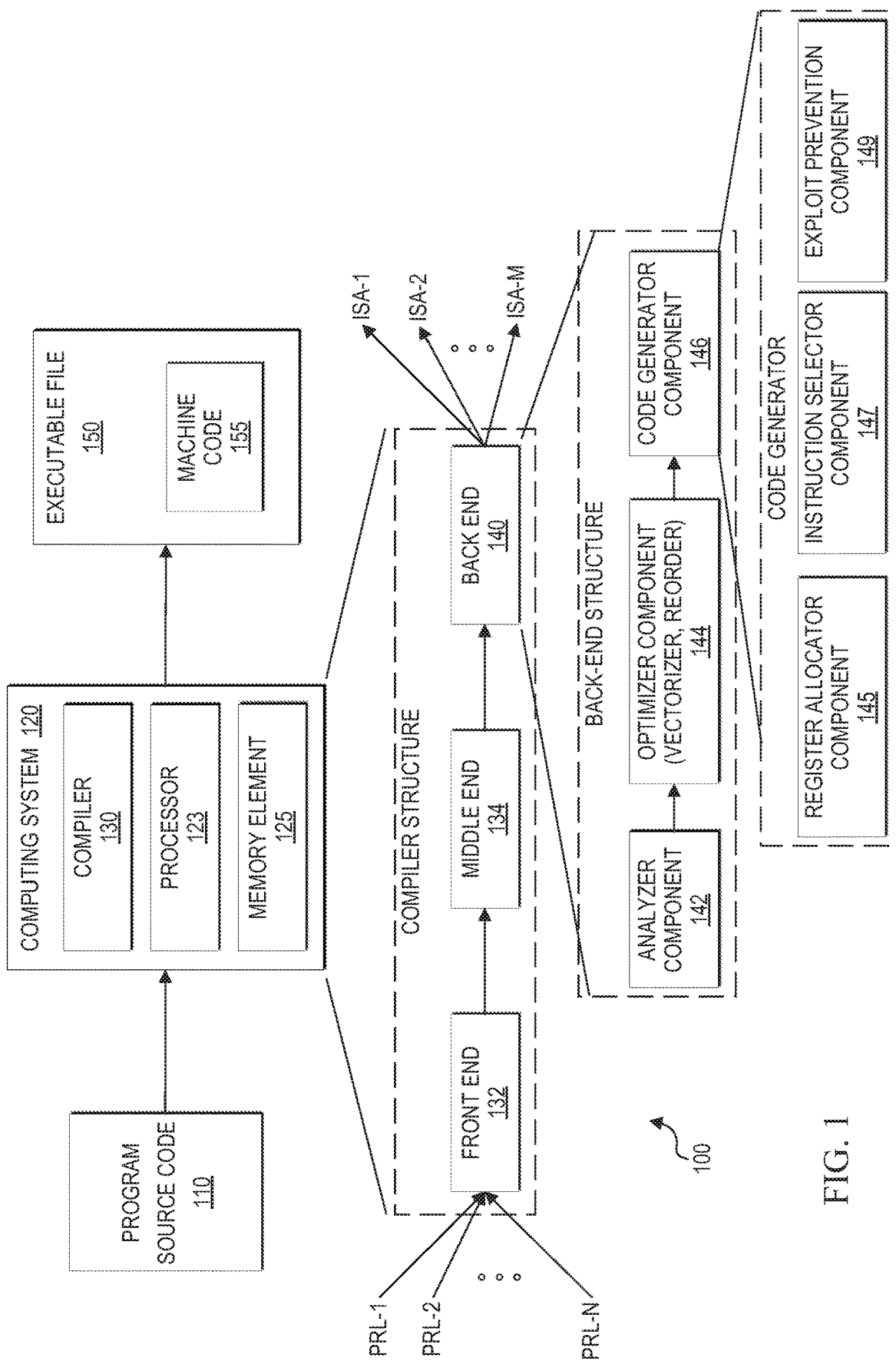
FIG. 1 is a simplified block diagram of a system for hardening applications against branch programming exploits according to an embodiment of the present disclosure.

FIG. 1 is a simplified block diagram of a compiler system 100 for hardening software programs against branch programming exploits. Compiler system 100 includes a computing system 120 comprising a compiler 130, a processor 123, and a memory element 125. Computing system 120 can receive program source code 110 as input and, upon completing compilation of the program source code, can provide an executable file (or object file) 150 containing machine code 155 as output. The compiler structure of compiler 130 may include a front end 132, a middle end 134, and a back end 140. Compiler 130 can be configured to receive program source code of a particular type of programming language (e.g., PRL-1, PRL-2, through PRL-N) at front end 132. Compiler 130 can be configured to generate executable files encoded using a particular type of instruction set architecture (e.g., ISA-1, ISA-2, through ISA-M) based on processor 123. The executable files may be output from back end 140. The structure of back end 140 can include an analyzer component 142, an optimizer component 144, and a code generator component 146. Code generator component 146 can perform operations that include register reallocation by register allocator component 145, instruction selection by instruction selector component 147, and exploit prevention analysis and code generation by exploit prevention component 149.

For purposes of illustrating embodiments of the system for hardening software programs against branch programming exploits, it is important to understand the activities that may be occurring in branching exploits, such as ROP. The following introductory information provides context for understanding embodiments disclosed herein.

Some software programs contain vulnerabilities that can be exploited for malicious or other unauthorized purposes. A software program may also be referred to herein as a 'program' or an 'application.' Generally, a vulnerability in a program is a weakness, flaw, error, mistake, defect, fault, or security bug that allows an attacker to cause failure, deviation from expected results, or unintended behavior by the program. Example effects of bugs can include, but are not limited to, causing a software program to crash, allowing a malicious user to bypass access controls and obtain unauthorized privileges to an endpoint or network, allowing access to confidential or sensitive data, or causing a software program to propagate malware to other endpoints or networks.

A code reuse attack is a type of software exploit enabled by certain software vulnerabilities. Code reuse emerged as a form of malware due to the general success of other security techniques implemented by operating systems and processors in preventing execution of object code on a heap or stack. These security techniques include, for example, Address Space Layout Randomization (ASLR), Execute Disable Bit (EDB), and Supervisor Mode Execution Prevention (SMEP) pages. In a code reuse attack, an attacker can direct control of a program flow through existing code to produce an unauthorized or unwanted result. For example, if a vulnerability exists in the program, then an attacker that is aware of the vulnerability can exploit that vulnerability in order to change the flow of execution in the program for a malicious purpose.

One technique by which a code reuse attack has been implemented is return-oriented programming (ROP). A binary of a program to be exploited can be pre-analyzed to find gadgets of code that can be executed. A 'gadget' is an executable instruction sequence with specific properties, which may be useful for malware, such as register/memory-controlled jumps, calls, or returns. Gadgets can be selectively executed in a malware attack using ROP. In this type of exploit, the final sequences of code that are executed may deviate from the normal sequence of code and may perform malicious or otherwise unintended or unwanted operations. More specifically, ROP uses return instructions that are part of the instruction set architecture. A return instruction transfers program control from a function or procedure to a return address on the stack, which is typically placed there by a call instruction. Because instructions can operate on the stack, and if the stack is corrupted, then the program flow on the next return can potentially be directed to a different place than the original intent of the code. Consequently, an attacker can use existing return op codes in the program to execute different executable portions of code to achieve an unauthorized, potentially malicious result.

Other techniques may also be exploited for code reuse. For example, call-oriented programming (COP) and jump-oriented programming (JOP) are variances of the ROP technique, and can also be used to perform a code reuse attack on a program. COP uses a call instruction and JOP uses a jump instruction. A call instruction calls or passes control to a function or procedure, which can be specified with a target operand (e.g., immediate value, register, or memory location). A call instruction can operate on information in memory that, if corrupted, could cause the call to go to a different location than the intended location. A jump instruction transfers control to a different point in the instruction stream, which can be specified with a target operand (e.g., immediate value, register, or memory location). A jump instruction operates on information in memory that, if corrupted, could cause the flow to go to an unintended location in memory that is executable, but executed at random offsets in the program. Generally, there is no enforcement by a computing system to control branches within the code used in ROP, COP and JOP.

Control-flow Enforcement Technology (CET) is a technology offered by Intel Corporation of Santa Clara, Calif. to protect against code reuse attacks. CET is designed to harden software and make it more reliable. In particular, CET provides new central processing unit (CPU) capabilities to enforce correct execution flow using a shadow stack and designated CET instructions, such as an ENDBRANCH instruction. In CET, a shadow stack is used for control transfer (also referred to herein as 'branch') operations in addition to the traditional stack used for control transfer and data. For example, a CALL instruction pushes the return address to the shadow stack in addition to the traditional stack. A return instruction, such as RET, pops the return address from both the shadow stack and the traditional stack. Control is transferred to the return address if the return addresses popped from both stacks match.

In CET, a particular instruction such as ENDBRANCH can be used to enforce correct execution control. An ENDBRANCH instruction is an instruction added to the instruction set architecture (ISA) for CET to mark a valid target for an indirect branch or jump. An indirect branch instruction specifies where the address of the next instruction to execute is located, rather than a direct branch, which specifies the actual address of the next instruction to execute. If ENDBRANCH is not a target of an indirect branch or jump, the CPU can generate an exception indicating a malicious or unintended operation has occurred. In an example CET use case, a compiler generates object code from a high-level programming language (e.g., C++, scripted-oriented language, etc.) and injects an ENDBRANCH instruction at every expected control transfer point (also referred to herein as 'branch point') of the object code (e.g., where a program performs a call, any kind of jump, return, software interrupt, etc.).

Although CET can provide protection against ROP attacks via ENDBRANCH and the shadow stack, machine code can be full of potential gadgets in unexpected places. For example, certain architectures are designed to use instructions having variable lengths, such as the Intel® X86 instruction set architectures (ISAs), which provide an instruction length from 1-16 bytes. Instructions that are encoded with multiple bytes could potentially contain one or more bytes that are branching instructions. A short return instruction (e.g., one or two-byte operation code), for example, may appear as data or a parameter a multi-byte instruction. In an example, a one-byte return operation code (also referred to herein as 'opcode'), such as 0xC2 or 0xC3, may be encoded as an operand or part of an operand in a multi-byte instruction.

CET and other techniques do not address the issue of being able to execute branching instructions (e.g., return, call, jump) that are encoded within a variable length instruction. Even if execution flow is enforced, it may still be possible to circumvent the execution flow by branching into the instruction, rather than branching to its beginning, since the instruction pointer can have any value and variable length instructions are not marked to indicate branching. Therefore, when a jump is made to some location within a multi-byte instruction, the control enforcement is not maintained since the instruction is not marked (e.g., with an ENDBRANCH). In this scenario, the control flow could jump into an instruction with multiple bytes, and use parts of the instruction operation code and/or instruction operand as a new, unexpected and unprotected instruction. An opcode is the portion of a machine language instruction that specifies the operation to be performed. An operand is the portion of a machine language instruction that specifies which data is to be operated on or manipulated, while at the same time may represent the data itself. By way of example, if a value representing a return instruction opcode (e.g., 0xC2 or 0xC3) is encoded in a multi-byte instruction as part of the multibyte instruction's opcode or operand, the control flow could jump to that value within the multi-byte instruction and use it for malicious purposes.

Other security technologies similarly do not sufficiently mitigate ROP attacks. For example, another technology for removing jump oriented programming (JOP) gadgets is limited to types of gadgets that can be removed and works only by replacing a limited set of instructions, which can impact performance. None of the existing solutions prevent all potential branching exploits. Moreover, instructions with specific register pairs (e.g., eax+ebx, eax+edx, etc.) can contain values corresponding to branching instructions (e.g., return, jump, call, etc.) as part of its opcode or operand and can be targeted by branching exploits (e.g., ROP, JOP, COP, etc.).

A compiler is computer software that transforms program source code written in one programming language into another programming language. A compiler typically translates source code of a particular programming language into machine code with the goal of maintaining original semantics and achieving high performance. Usually, the resulting code contains multiple instances of unintended vulnerable bytes in instructions, which make it possible to run existing code in the middle of one or more of the instructions. ROP exploits can be used to find gadgets, which are not protected by other means (e.g., CET). Techniques are needed to prevent vulnerable bytes that represent branching instructions from being encoded within longer, variable length instructions.

Embodiments disclosed herein can resolve the aforementioned issues (and more) associated with branch programming exploits. In compiler system 100, compiler 130 is enhanced to harden code by avoiding the generation of exploitable gadgets in code produced by the compiler from a high-level programming language (e.g., C/C++, ObjC, Go, Fortran, etc.). Code is hardened by generating a frame pointer for functions with a stack-based register and generating prologue/epilogue code for functions to use a stack frame. This can be accomplished by inserting a dedicated 'LEAVE' instruction in some architectures (e.g., Intel x86). If every return instruction is preceded by a LEAVE instruction, combining gadgets is greatly complicated. The LEAVE instruction restores a stack pointer from a base pointer and, as a result, complicates use of the return instruction at the function epilogue as part of a gadget. Use of the stack frame forces an attacker to manipulate a base pointer, which can thwart an attacker due to the complication for exploiting a return instruction.

Code is also hardened by preventing the generation of specific values as part of opcode and/or data in a multi-byte instruction, where the values can be interpreted as branching instructions (e.g., return, call, jump). When a vulnerable value is detected in an encoded instruction, the instruction can be replaced with a sequence of one or more alternative instructions that are semantically equivalent, but without encodings of vulnerable values (e.g., one or more bytes corresponding to a branching instruction). These replacement instructions can depend, at least in part, on the particular location of a vulnerable value within an encoded instruction. In other scenarios, where instructions may not be simply replaced with alternative instructions, a feedback loop may be used to request another component of the compiler to perform an action to cause a new instruction or instructions to be generated. The action can include, for example, requesting that vectorization not be applied to the new instruction, request new or different registers to be allocated for particular variables or as replacement registers, and/or request the reordering of a basic block of the function being compiled. The action can cause one or more new instructions to be encoded with values that are not vulnerable, while remaining semantically equivalent. The new instruction or instructions are considered semantically equivalent if they produce a result when executed that is equivalent to a result produced when the original instruction is executed.

It should be noted that concepts disclosed herein can be applied to different types of security exploits that involve branching. Examples of security exploits to which embodiments described herein may apply include, but are not necessarily limited to, return oriented programming (ROP) involving return instructions, jump oriented programming (JOP) involving jump instructions, and call oriented programming (COP) involving call instructions (CALL). For ease of illustration herein, however, references may be made to ROP and return instructions such as the RET instruction of the Intel® x86 ISA. It should be appreciated that the concepts related to the embodiments described with reference to return instructions are applicable to other branching instructions both in the Intel® x86 ISA and to comparable branching instructions (e.g., return, call, jump) in other ISAs.

Compiler system 100 provides several advantages as it minimizes the number of usable gadgets in a piece of code. When applied to system libraries (e.g., glibc, msvcrt, etc.) through recompilation, the attack surface is significantly reduced while maintaining compatibility with existing processors and operating systems. Compatibility is achieved because new instruction support is not required, so it can be applied to existing code base as a system update. Compiler system 130 can be a complementary solution to other branching security protections. Compiler system 130 includes deep integration changes to compiler 120 to enable techniques described herein for hardening program source code as compared to parsing assembler code. The enhanced compiler can identify and mitigate more occurrences of vulnerable values that may be generated as part of a multi-byte instruction. In addition, by inserting a dedicated LEAVE instruction, compiler system 100 can harden code against stack pivot, while minimizing performance overhead.

Turning to FIG. 1, a brief discussion is now provided about some of the possible infrastructure that may be included in compiler hardening system 100. Computing system 120 is intended to represent any type of device that can compile software. Computing systems can include, but are not limited to, servers, desktops, laptops, workstations, tablets, mobile devices, smartphones, etc. (any of which may include physical hardware or a virtual implementation on physical hardware), or any other device, component, or element capable of running a compiler (e.g., compiler 130). At least some computing systems may also be inclusive of a suitable interface to a human user (e.g., display screen, etc.) and input devices (e.g., keyboard, mouse, trackball, touchscreen, etc.) to enable a human user to interact with the computing system and an interface to the compiler to provide input and to receive information for example, reports based on results of compilation activities and/or compiled code.

In at least one embodiment, compiler 130 includes a compiler structure through which program source code (e.g., 110) is processed. Compilers generally process source code of one type of programming language. Compiler 130 is intended to represent various compilers that handle different programming languages, as represented by PRL-1, PRL-2, through PRL-N. Front end 132 of compiler 130 receives the program source code and processes source code based on the particular programming language of the code. In one example, the program source code may be normalized by front end 132 such that its distinction from other programming languages is removed. Middle end 134 may generate a logical description of the program source code, which is typically embodied as a graph of data and control flows. The graph defines how the input data should be transformed. The resulting graph is transformed from the high-level language at input, but does not contain executable code suitable for a central processing unit (CPU). The graph may be an intermediate representation (IR), which is the data structure or code used internally by a compiler to represent source code, but which can be further optimized and translated into machine code that is executable by a CPU.

Back end 140 selects appropriate instructions in a particular instruction set architecture to implement the functionality defined by the intermediate representation generated by middle end 134. The particular instruction set architecture, ISA-1 through ISA-M, used by back end 140 depends on the type of CPU (e.g., processor 123) of the computing system. During processing, back end 140 can include analyzer component 142 to analyze the control and data flow graph, and optimizer component 144 to perform optimizations (e.g., vectorization, basic block ordering, etc.) on the analyzed control and data flow graph. Back end 140 also includes code generator component 146, which allocates registers for instructions and selects instructions to implement the functionality expected by the program.

At least one embodiment provides additional functionality in the code generator component where register allocation and instruction selection from an intermediate representation (IR) of the source code are performed. The additional functionality can be implemented as exploit prevention component 149, which includes evaluating each instruction that is generated from the intermediate representation into a particular instruction format. An instruction is evaluated to determine whether it contains any vulnerable values. As used herein, a 'vulnerable value' is intended to mean one or more bytes in an instruction that are potentially exploitable in an attack, such as a ROP exploit or any other branching exploit.

In an example, in the x86 ISA, byte values of 0xC2 and 0xC3 are the opcodes for a return instruction (e.g., RET). When encoded as the opcode in an instruction, 0xC2 or 0xC3 performs a near return to a calling procedure within the current code segment. When executing a near return, the processor pops the return instruction pointer from the top of the stack into an extended instruction pointer (EIP) register, and pops the segment selector from the top of the stack into the code segment (CS) register. The processor can begin program execution in the new code segment at the address indicated by the new instruction pointer.

Although 0xC2 or 0xC3 may be encoded as an opcode of an instruction to perform a near return, in other scenarios, 0xC2 or 0xC3 may be encoded within a multi-byte instruction that is generated to perform a different operation. The encoded 0xC2 or 0xC3 byte may be vulnerable to a ROP exploit because malicious code could potentially jump into the instruction at the location of the 0xC2 or 0xC3 byte. Accordingly, embodiments herein evaluate each multi-byte instruction after the instruction is generated and identify whether a vulnerable value (e.g., 0xC2 or 0xC3), if any, is encoded at some location in the instruction. Embodiments herein provide for removing the vulnerable values from the identified locations of the instruction code. Although return instructions in an x86 ISA include 0xC2 and 0xC3, returns may be implemented differently in other architectures. For example, a return may be implemented as a 'bx lr' instruction or as part of ldmfd sp!, { . . . , pc} in Advanced RISC Machines (ARM) instruction set architecture.

If a vulnerable value is identified in an instruction, an action may be performed based, at least in part, on the location of the identified vulnerable value within the instruction. The action may also be based, in part, on the type of instruction in which the vulnerable value is found and/or other encodings in the instruction (e.g., bit(s) that indicate data transfer direction). Possible actions include selecting different encoding for the instruction, sending feedback signals to request register allocation changes for the instruction, sending feedback signals to prevent vectorization, sending feedback signals to reorder basic blocks of the code, or providing a report with information related to an instruction containing one or more vulnerable bytes that may (or may not) have been not mitigated.

If a vulnerable value is identified in part of the opcode field of a multi-byte instruction, a feedback signal may be sent to the optimizer component 144 to prevent the optimization phase from performing vectorization. Thus, when the instruction is re-generated in the code generation phase, the previously packed instruction may be replaced with a scalar instruction, where an operation is performed for each value rather than being applied to an array of values. If performance is important, however, the feedback signal may not be sent and instead, information related to the instruction may be provided to a user. The user may then decide whether to change the source code so that these identified instructions are not generated. Alternatively, the user may set a flag that instructs the compiler not to generate the packed instructions, regardless of the performance.

If a vulnerable value is identified in another part of a multi-byte instruction, then either the instruction can be changed, a basic block of code can be reordered, or one or more registers may be changed or newly allocated. If the instruction can be encoded in multiple ways, then a different representation of the same instruction may be selected. This can be accomplished by modifying one or more bits in the instruction. If the instruction cannot be encoded in an alternative way, however, then a feedback signal may be provided to the register allocator component to request a new or different register to be allocated or reallocated for the instruction. The register allocator component can modify which registers are to be used for specific variables because most of the registers are general purpose and can be used for anything. Accordingly, the first available register may be selected in at least some scenarios.

Embodiments herein may also evaluate each single-byte instruction to identify a vulnerable branching instruction, such as RET, CALL, or JMP. In some architectures, the branching instruction may be encoded using more than one byte. In this scenario, the multi-byte instruction is evaluated to determine if it is a branching instruction e.g., (return, call, jump, etc.) or something else. If the instruction is determined to be a branching instruction in a function with a stack-based register, then a frame pointer may be generated for the function. In at least one embodiment, register allocation component 145 can be configured to require the use of a frame pointer. The epilogue code for the function can be modified to ensure restoration of the frame pointer. A function epilogue refers to code at the end of a function that restores the stack and registers to the state they were in before the function was called. In the x86 ISA for example, this is achieved by inserting a dedicated LEAVE instruction in a function prior to a RET instruction in the function. For example, LEAVE can be used to replace the first two instructions in the following sequence:

mov esp, ebp
pop ebp
ret

Although this may be implemented differently in other ISAs, a frame pointer is typically available in other architectures (e.g., frame pointer (FP) on ARM). If the LEAVE instruction is not inserted before the RET instruction, then jumping into the middle of the mov instruction may be interpreted as: in al, dx. This does not restore the stack pointer, puts a value in ebp that is known to the attacker, and jumps to the desired address. Thus, the restoration of the frame pointer is avoided and a buffer overflow attack may occur.

The LEAVE instruction complicates exploitation of branching instructions by forcing an attacker to manipulate a base pointer to access a stack. When a function is called, the function typically receives some parameters as input, performs some data transformation, and returns a value or values to the calling code. A common convention to pass the parameters to the function is by pushing the parameters onto a stack. A stack frame associated with a particular function refers to the space in the stack that is allocated to be used by the function for passing parameters and results of the function. In order to access the stack frame, certain older architectures did not enable the use of a stack pointer (SP) to directly address the stack. Thus, a copy of the SP was made to a base pointer, which was used as an indirect address to obtain the data from the stack. In the x86 architecture, an ENTER instruction pushed the SP to the BP, while a LEAVE instruction moved the BP back to the SP and popped BP from the stack.

Inserting the LEAVE instruction before a RET instruction changes the SP to become the value of the BP, which prevents stack pivoting. In stack pivoting, the SP is pointed to an attacker-owned buffer (e.g., heap) to provide more options for the attacker to carry out an attack. A sequence of LEAVE and RET instructions consists of two bytes in the x86 architecture. Accessing the RET instruction directly would be meaningless to an attacker and, therefore, some instruction is needed before the RET instruction to do variable transformation in the registers to identify code that is desired by the hacker.

The LEAVE instruction provides benefits over other similar code that could alternatively be generated. The LEAVE instruction is a single-byte instruction, so an attacker cannot avoid it when using a following RET instruction by jumping in the middle of it, thus making LEAVE/RET pair an ending of each potentially usable ROP gadget. So implementation of stack pivoting by an attacker is complicated, as it cannot be performed by the attacker without first manipulating the base pointer, and code itself will not contain any manipulations on base pointer, except the function entry sequence, which itself means that the following sequence will not have the desired effect. The LEAVE instruction forces manipulation of the registers before the return and consequently, complicates exploitation. The LEAVE instruction is not inserted to avoid the RET instruction, but rather, to force the attacker to also manipulate the base pointer. LEAVE implies assigning the BP to the SP. Since there is a pivot table pointed to by the stack pointer, then the attacker would have to cause the BP to point to the table as well (since its content will be assigned to the SP), and add an additional entry for the POP EBP part of the LEAVE. If all or most of the functions have the LEAVE-based epilogue, the attacker will have to hack the BP register as well. Additionally, since LEAVE is a 1-byte instruction (0xC9), the gadget 0xC9 0xC3 is unlikely to be used by an attacker due to this complication of having to manipulate the BP value.

Figure 2:
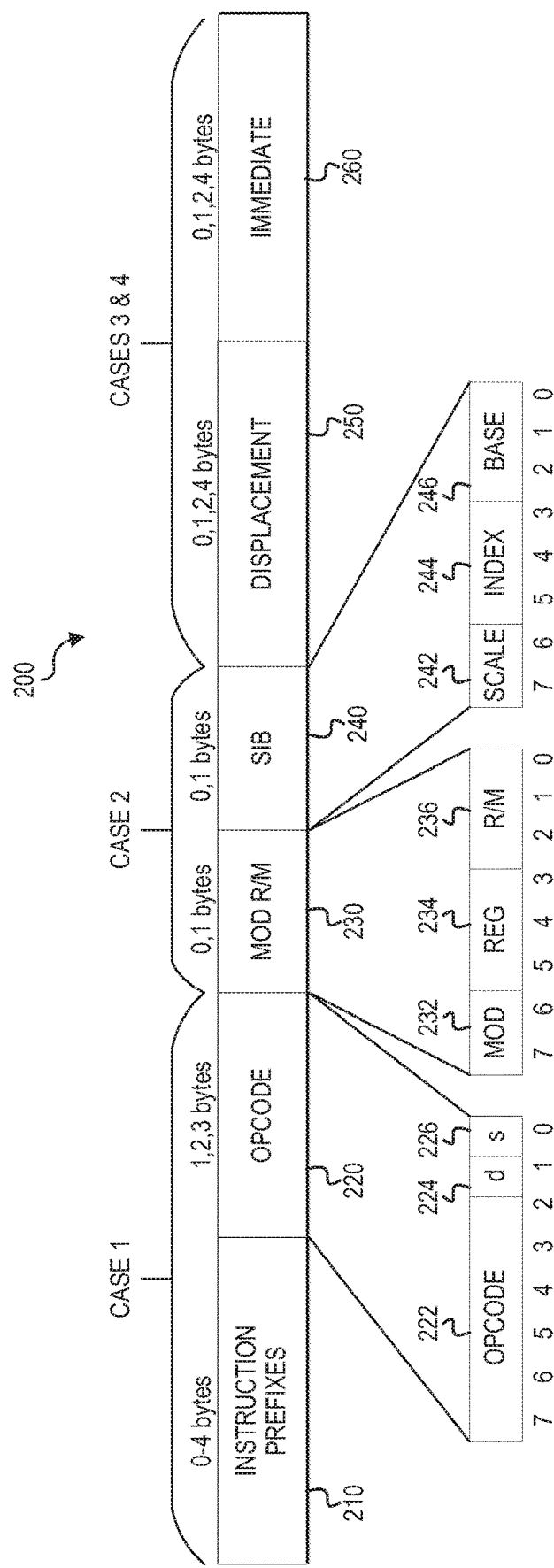
FIG. 2 is a simplified block diagram illustrating a format for an instruction of an example instruction set architecture that may be associated with at least one embodiment.

FIG. 2 is an example instruction format 200 of instruction encoding for an example instruction set architecture. Instruction format 200 includes instruction prefixes 210, operation code (opcode) field 220, mode and register memory (Mod R/M) field 230, Scale*Index+Base (SIB) field 240, displacement field 250, and immediate field 260. Certain encodings based on instruction format 200 may result in a multi-byte instruction in which a value (e.g., 0xC2 or 0xC3) corresponding to a return instruction is encoded in any one or more of the various fields of the instruction. A byte containing hexadecimal C2 is represented in eight bits as 1100 0010. A byte containing hexadecimal C3 is represented in eight bits as 1100 0011.

The instruction prefixes 210 may be from 0-4 bytes and each byte indicates a prefix that modifies the instruction's behavior. Opcode field 220 is 1-3 bytes and specifies which instruction the processor is to execute. In some instructions, opcode field 220 can allocate 6 opcode bits for the opcode itself, a d-bit 224, and an s-bit 226. If d-bit 224 is present in the instruction, it drives the direction of data transfer. The d-bit determines which operand is the source and which operand is the destination. In one example, the d-bit can be 0 if the first operand (e.g., R/M 236 field of Mod RIM field 230) is the destination and the second operand (e.g., REG field 234 of Mod RIM 230) is the source. The d-bit can be 1 if the first operand (e.g., REG field 234 of Mod RIM 230) is the destination and the second operand (e.g., RIM field 236 of Mod RIM 230) is the source. The s-bit can be 0 if 8-bit operands are used and 1 if 32-bit operands are used.

The Mod RIM field 230 specifies instruction operands and their addressing mode. Mod R/M field 230 can contain a 2-bit MOD subfield 232, a 3-bit REG subfield 234, and a 3-bit R/M subfield 236. The MOD subfield 232 specifies the x86 addressing mode. The REG subfield 234 specifies a source or destination register. The R/M subfield 236, combined with the MOD subfield 232, specifies either the second operand in a 2-operand instruction or the only operand in a single-operand instruction. The d-bit in the opcode determines which operand is the source and which operand is the destination (e.g., d=0 indicates REG is the source and MOD R/M is the destination, d=1 indicates REG is the destination and MOD R/M is the source). A 0xC2 value in a Mod R/M subfield would be the following: MOD=11, REG=000, R/M=010. A 0xC3 value in a Mod R/M byte would be the following: MOD=11, REG=000, R/M=011.

The SIB field 240 is an addressing format available in 32-bit mode that enables complicated addresses. The SIB field 240 contains a 2-bit scale field 242, a 3-bit index field 244, and a 3-bit base field 246. A SIB field is present in an instruction when the MOD R/M field contains the correct MOD and R/M combination. The index subfield 244 and base subfield 246 select the base and index registers, respectively. A SIB value is computed based on (index*2^scale)+base. The SIB value is used in place of the value of the R/M subfield 236 in the memory address computation. A 0xC2 value in a SIB field would be the following: SCALE=11, INDEX=000, BASE=010. A 0xC3 value in a SIB field would be the following: SCALE=11, INDEX=000, BASE=011.

Displacement field 250 is part of the operand's address based, at least in part, on the MOD subfield 232. For example, if the MOD subfield contains 01 or 10, the displacement field 250 is used. In another example, if the MOD subfield contains 00 and the RIM subfield contains 101, then this combination indicates it is the displacement-only addressing mode. Displacement can be 0, 1, 2, or 4 bytes. A 0xC2 value could be encoded in a displacement field in the following ways: 1-byte: 1100 0010, 2-byte: xxxx xxxx 1100 0010 or 1100 0010 xxxx xxxx, or 4-byte: 1100 0010 xxxx xxxx xxxx xxxx xxxx, xxxx xxxx 1100 0010 xxxx xxxx xxxx, xxxx xxxx xxxx 1100 0010 xxxx xxxx, or xxxx xxxx xxxx xxxx xxxx xxxx 1100 0010. A 0xC3 value could be encoded in a displacement field in the following ways: 1-byte: 1100 0011, 2-byte: xxxx xxxx 1100 0011 or 1100 0011 xxxx xxxx, or 4-byte: 1100 0011 xxxx xxxx xxxx xxxx xxxx, xxxx xxxx 1100 0011 xxxx xxxx xxxx, xxxx xxxx xxxx 1100 0011 xxxx xxxx, or xxxx xxxx xxxx xxxx xxxx xxxx 1100 0011. In these representations, 'x' denotes any bit value (0 or 1). There may be multiple occurrences of 0xC2 and 0xC3 in 2- and 4-byte displacements, each handled as separate case.

Immediate field 260 may be used as an operand in some instructions.

Immediate field 260 can be 0, 1, 2, or 4 bytes. A 0xC2 value could be encoded in an immediate field in the following ways: 1-byte: 1100 0010, 2-byte: or xxxx xxxx 1100 0010 or 1100 0010 xxxx xxxx, or 4-byte: 1100 0010 xxxx xxxx xxxx xxxx xxxx, xxxx xxxx 1100 0010 xxxx xxxx xxxx xxxx, xxxx xxxx xxxx 1100 0010 xxxx xxxx, or xxxx xxxx xxxx xxxx xxxx xxxx xxxx 1100 0010. A 0xC3 value could be encoded in an immediate field in the following ways: 1-byte: 1100 0011, 2-byte: xxxx xxxx 1100 0011 or 1100 0011 xxxx xxxx, or 4-byte: 1100 0011 xxxx xxxx xxxx xxxx xxxx, xxxx xxxx 1100 0011 xxxx xxxx xxxx xxxx, xxxx xxxx xxxx 1100 0011 xxxx xxxx, or xxxx xxxx xxxx xxxx xxxx xxxx 1100 0011. In these representations, 'x' denotes any bit value (0 or 1). There may be multiple occurrences of 0xC2 and 0xC3 in 2- and 4-byte displacements, each handled as separate case.

Figure 3:
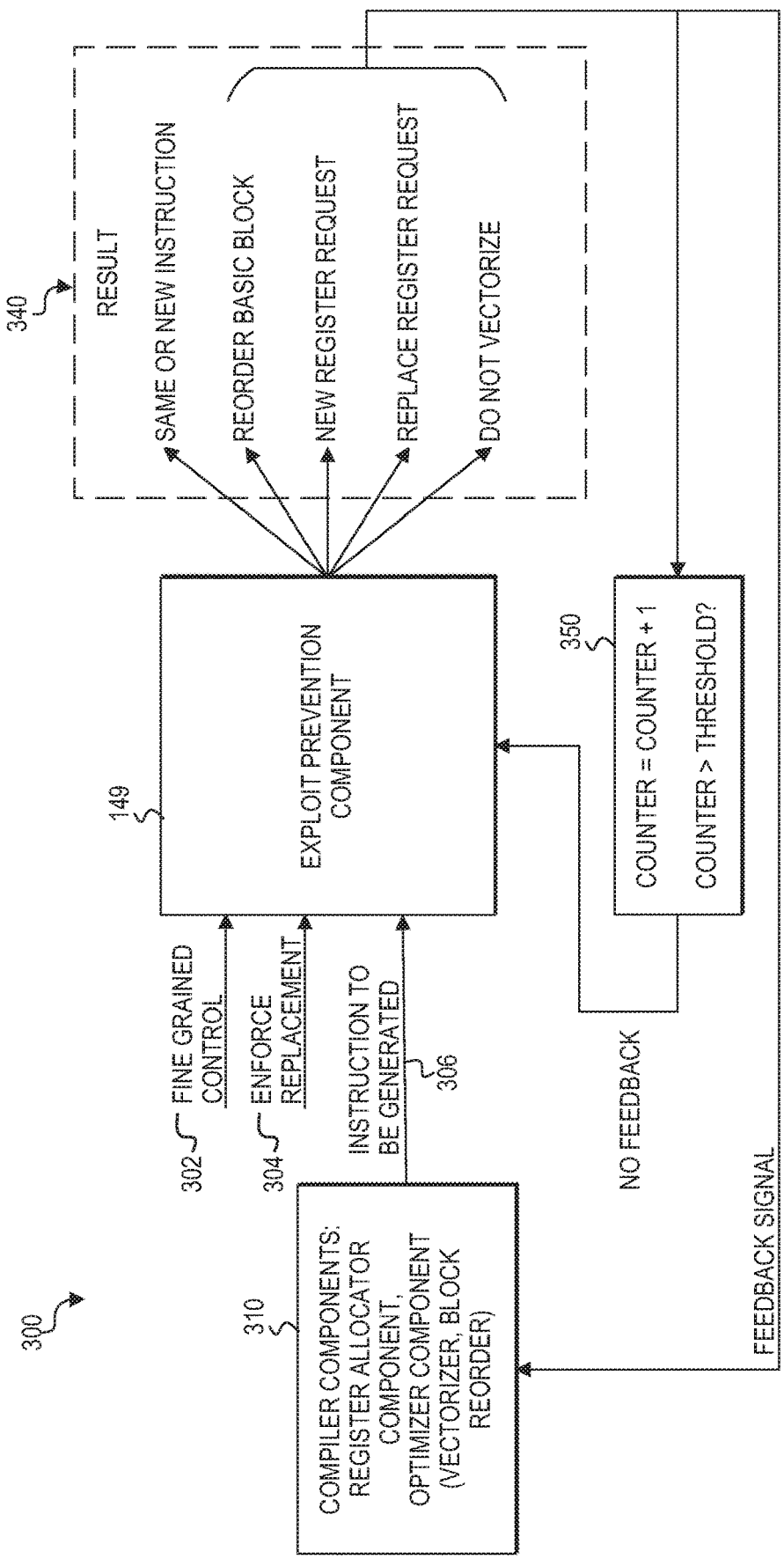
FIG. 3 is a simplified block diagram of possible interactions of certain components of an example compiler according to at least one embodiment.

Turning to FIG. 3, FIG. 3 is a simplified interaction diagram 300 of certain components of example compiler 130 according to at least one embodiment. Interaction diagram 300 shows exploit prevention component 149 and certain other compiler components 310 combined for simplicity. In at least one embodiment, exploit prevention component 149 and compiler components 310 offer an iterative process for functions of a software program that is being compiled. The iterative process can include one or more of optimizing instructions based on feedback signals, allocating registers for instructions based on feedback signals, reordering basic blocks based on feedback signals, and analyzing encoded instructions and generating sequences of alternative instructions to replace the analyzed instruction and to prevent branching exploits from the compiled function.

Compiler components 310 represents one or more components of the compiler that initially process instructions of a function prior to the exploit prevention component 149 receiving the instructions for processing. The components represented by compiler components 310 include components that may receive one or more feedback signals from exploit prevention component 149 based on results from analyzing the received instructions. Embodiments herein provide for an iterative process involving compiler components that are part of back end 140 of compiler 130, and that process an intermediate representation of the function being compiled. Feedback signal means that execution of exploit prevention component 149 is aborted, and control and signal data (location of vulnerable byte and associated data such as type of signal, specific registers, etc.) is passed to earlier compiler phase, forcing repeating of following compilation where the feedback signal is taken into account. For example, register allocator component 145 and optimizer component 144 may receive feedback signals. Certain functionality, such as vectorizing code and reordering basic blocks may be integrated into optimizer component 144. In other embodiments, these functionalities may be separate from optimizer component 144. Moreover, any of these components may be combined or functionally or logically separated depending on particular implementations and needs.

In at least one embodiment, exploit prevention component 149 is configured to receive each instruction 306 of a function that has been processed by one or more of compiler components 310 and encoded in machine format (e.g., instruction format 200, etc.). Upon receiving an instruction at 306, which is to be generated into an executable file (e.g., 150), exploit prevention component 149 analyzes the instruction and determines whether it contains any vulnerable values. A location of a vulnerable value within the instruction is also identified. Vulnerable values can include a branching opcode (e.g., return, jump, call, etc.) encoded in some location within the instruction. For example, a one-byte return opcode in the x86 ISA has a value of 0xC2 or 0xC3. Based on the location of a vulnerable value in a multi-byte instruction, the processor does not recognize the vulnerable value as an opcode telling it what operation to perform. Instead, a vulnerable value may be recognized as an operand (e.g., Mod RIM field 230, SIB field 240, displacement field 250, immediate field 260) of the instruction or as a portion of the recognized opcode (e.g., opcode 220).

If a vulnerable value is detected in an instruction, exploit prevention component 149 determines how to process the instruction. This determination may be based on one or more of the following: 1) the location of the vulnerable value within the instruction, 2) checks related to the instruction based on the location of the vulnerable value, 3) an input criterion 304 to enforce replacement of the instruction, 4) a fine-grained control criterion 302 that requires a particular action, and/or 5) a counter 350 that indicates whether a feedback threshold has been satisfied.

In at least one embodiment, exploit prevention component 149 may take an action based on its analysis of the instruction. Actions include (but are not necessarily limited to) replacing the instruction with an alternative sequence of instructions that are semantically equivalent, sending a feedback signal to an appropriate compiler component and waiting to receive an updated instruction, or leaving the instruction as is. As shown in 340, the results of the exploit prevention component analyzing an instruction can include generating the same instruction or a new instruction (e.g., alternative sequence of instructions with same semantic), sending a feedback signal to reorder basic blocks, sending a feedback signal to request allocation of a new register, sending a feedback signal to request replacement of a register, or sending a feedback signal requesting that the instruction not be vectorized.

The action taken by exploit prevention component 149 when a vulnerable value is detected within an instruction may depend, at least in part, on the location of the vulnerable value within the instruction. For some locations (e.g., Mod R/M field 230, some types of operands in immediate field 260), the optimal solution may be to replace the instruction with a sequence of alternative instructions that have equivalent semantics. For other locations (e.g., opcode field 220, SIB field 240, displacement field 250, some types of operands in immediate field 260), the optimal solution may be to send a feedback signal to an appropriate compiler component and allow the compiler component to perform other transformations of the code, which could potentially lead to higher efficiency. Other transformations include, for example, register allocation and/or optimization (e.g., based on cost efficiency, no vectorization, block reordering).

In some scenarios, exploit prevention component 149 may process the same instruction numerous times, and send a feedback signal to an appropriate compiler component each time, to attempt to rid the instruction of a vulnerable value or multiple vulnerable values. Each time a feedback signal is generated for an instruction, an internal mechanism may keep track of how many iterations have been performed for that particular instruction. For example, at 350, a counter is increased by one each time a feedback signal is generated for a particular instruction. The counter may keep track of iterations for a single instruction until it is marked as completed. The internal mechanism may be activated after some threshold number of iterations has been performed. Once the threshold has been satisfied, exploit prevention component 149 may attempt to replace the instruction if the vulnerable value is still present within the instruction and if replacing the instruction is possible. If the threshold has been satisfied, the exploit prevention component does not generate another feedback signal for that instruction, unless fine-grained control input overrides the internal threshold mechanism. It should be noted that a threshold can be 'satisfied' based on any suitable logic. For example, a threshold may be satisfied if it equals a threshold maximum amount, if it exceeds a threshold amount, if it meets or exceeds a threshold amount, or if it reaches or passes a threshold minimum amount (e.g., if the counter counts down instead of up).

In at least one embodiment, exploit prevention component 149 may receive one or more input criteria for determining an action to take when a vulnerable value is detected within an instruction. In one or more embodiments, input criteria may be provided via a command line option or via some programming language directive (e.g., # pragma in C/C++) that specifies machine-specific or operating-specific compiler features. The input criteria can allow a user (e.g., software developer) to provide directions to the compiler about how to handle certain lines of code in the software program. Thus, the user can have selective control over compiling one or more parts of the software program.

An enforce replacement criterion 304 can be provided for one or more particular fields of an instruction (e.g., opcode field 220, Mod R/M field 230, SIB field 240, displacement field 250, immediate field 260). For example, an enforce replacement criterion can be provided for the displacement field 250 to direct the exploit prevention component 149 to replace the instruction if a vulnerable value is detected in the displacement field of the instruction, rather than sending a feedback signal to a compiler component to perform an action.

A fine-grained control criterion 302 can be provided for one or more particular fields of an instruction (e.g., opcode field 220, Mod R/M field 230, SIB field 240, displacement field 250, immediate field 260) to direct the compiler to perform a particular action, regardless of the performance impact, the optimal solution, etc. For example, if security is especially critical in a certain function of the software program, then a fine-grained control criterion can be provided to direct the exploit prevention component 149 to continue sending feedback signals to the appropriate compiler components even if the feedback threshold has been satisfied. In another example, a fine-grained control criterion can be provided to direct the exploit prevention component 149 to make no changes to a particular instruction, even if a vulnerable value is found within that instruction.

In at least one embodiment, if exploit prevention component 149 detects a vulnerable value in an instruction, a compiler component that can transform the instruction to remove the vulnerable value may be identified based on the location of the vulnerable value detected within the instruction and, in at least some cases, based on the actual instruction itself. A register allocator component 145 may be identified to receive a feedback signal based on a vulnerable value being detected in any of the operand fields of an instruction. For a vulnerable value in some locations (e.g., displacement field 250, immediate field 260), a feedback signal may be sent to the register allocator component 145 to request a change in registers used in the instruction for specific variables. For example, a feedback signal can request a register for a new intermediate value or can request a change in the register for a specific intermediate value. For a vulnerable value in some other locations (e.g., Mod RIM field 230, SIB field 240), a feedback signal may be sent to the register allocator component 145 to request a different register based on a particular combination of registers that are encoded in the instruction and that cause a vulnerable value (e.g., 0xC2 or 0xC3) to be encoded in the instruction.

An optimizer component (e.g., 144) may be identified to receive a feedback signal based on a vulnerable value being detected in an opcode of an instruction. If a vulnerable value is detected in the opcode field 220, then this may be indicative of an instruction that has been vectorized. Code can be vectorized during compilation (e.g., by optimizer component 144) if the code applies the same operation to multiple values. In this scenario, special instructions may be used to all operations on multiple values at the same time. These special instructions are referred to as single instruction multiple data (SIMD). When code has been vectorized, it is possible for vulnerable values such as 0xC2 or 0xC3 to be encoded in the opcode field of the instruction. When this is detected by exploit prevention component 149, a feedback signal may be sent to the optimizer component 144 to request that the instruction be reprocessed without applying vectorization, and instead to use scalar instructions.

An optimizer component (e.g., 144) may also be identified to receive a feedback signal based on a vulnerable value being detected in certain operand fields of an instruction. In some scenarios, for a particular type of instruction (e.g., division instruction using immediate operands), the feedback signal can provide two or more options for transforming the instruction to remove the vulnerable code. The optimizer component 144 may evaluate each of the options provided with the feedback signal and select one of the options based on cost, performance, and/or any other suitable criteria.

An optimizer component (e.g., 144) may also be identified to receive a feedback signal based on the location of a vulnerable value in an instruction and the type of instruction. For example, it may be possible to reorder a basic block in order to remove a vulnerable value from a jump instruction, a call instruction, or jump if condition is met instruction. In some instances, the instruction itself may be transformed to no longer require branching.

Example Cases

Four exemplary cases, in which vulnerable values (e.g., 0xC2 or 0xC3) that correspond to return instructions can be present in a multi-byte instruction based on instruction format 200 of FIG. 2, are now described. Each of these cases may be uniquely handled in one or more ways to eliminate the presence of the identified byte, 0xC2 or 0xC3, which could be exploited to execute existing code in an unintentional and/or unauthorized manner. In some scenarios if the identified byte, 0xC2 or 0xC3, cannot be removed from the instruction, then information related to the unmodified instruction may be reported to a user.

Case 1

In Case 1, a byte in the opcode 220 may contain 0xC2 or 0xC3. In some cases, 0xC2 or 0xC3 may be included in an opcode of an instruction to perform a comparison of floating point values. For example, 0xC2 may be encoded in compare instructions (e.g., CMPPS, CMPSS, CMPPD, CMPSD_XMM) of the Streaming SIMD Extensions (SSE) instruction set. It should be noted that CMPxx instructions are typically used in compute code. Thus, the probability of those instructions in code vulnerable to buffer overflow attacks is low. The 0xC2 value may be encoded in compare instructions (e.g., VCMPPD, VCMPPS, VCMPSD, VCMPSS) of the Advanced Vector Extensions instruction set. The 0xC2 value may be encoded in packed integer instructions (e.g., VPROTD, VPHADDBQ) of the Advanced Micro Devices (AMD) instruction set. The 0xC3 value may be encoded in packed integer instructions (e.g., VPROTD, VPHADDBQ) of the AMD instruction set. The 0xC3 may also encoded in copy/move instructions (e.g., MOVNTI) of the SSE instruction set.

Although not common, it is possible for 0xC2 or 0xC3 to be encoded in the opcode field 220 containing a different opcode to be executed. In at least some scenarios, one or more of these instructions can be replaced with alternative sequences. For example, CMPSx can potentially be replaced with COMISx for scalars and further propagation of the flag register into mask through pushf/pop, reg, setx reg, lahf, etc. If performance will be impacted, however, then the alternative sequence may not be used. Therefore, when possible, replacement of the instruction with a scalar version (e.g., COMIS), which is not vectorized, may be attempted, but if significant changes in the semantics and performance is likely, then the instruction may remain as is.

In at least one implementation, if an instruction containing 0xC2 or 0xC3 in the opcode field 220 is not changed, then information can be provided to a user (e.g., as a report, alert, etc.) related to the unchanged instruction. For example, the information could potentially identify the instruction and provide further information on what actions can be taken to mitigate the vulnerable byte or bytes in the instruction. The user may set a flag indicating that the instruction containing the vulnerable byte or bytes is not wanted, which can force the compiler to generate another sequence of instructions with opcodes that do not contain 0xC2 or 0xC3 bytes. This may prevent certain optimizations from being performed such as, for example, vectorization.

In another implementation, if an instruction containing 0xC2 or 0xC3 in the opcode field 220 is not changed, then a feedback signal can be sent to the optimizer component 144. The feedback signal can indicate that no vectorization is to be used to optimize the code. For example, optimizing the code to apply an operation to all values in an array or vector may be avoided, and a scalar version of the instruction can be generated where the operation is applied to each value in the vector of values. By not applying vectorization, the original instruction containing the vulnerable value in the opcode is not generated. Instead, other instructions are generated to accomplish the same result in a different manner (e.g., using scalar instructions to apply an operation to multiple individual values rather than using a packed instruction).

Case 2

In Case 2, several types of register usage can cause 0xC2 or 0xC3 values to appear as part of the instruction in the MOD RIM field 230 or in the SIB field 240. Particular combinations of registers can lead to the Mod RIM field 230 or SIB field 240 becoming a 0xC2 or 0xC3 value. For example, in the Mod RIM field 230, the value 0xCx is common with register-register addressing, which is indicated by the 2-bit MOD subfield 232 being set to a bit representation of 11. In this case, when the RIM subfield 236 points to the edx register (having a bit representation of 010) or to the ebx register (having a bit representation of 011), and the REG subfield 234 points to another register eax (having a bit representation of 000), then the Mod RIM field 230 contains the value of 0xC2 or 0xC3, respectively. It should be noted that equivalent registers for 8-bit, 16-bit, and 64-bit data (e.g., dl, dx, rdx, bl, bx, rbx, ax, al, rax) also results in the Mod RIM field 230 containing the value of 0xC2 or 0xC3.

It should also be noted that a vector extension (VEX) prefix may also be provided in certain instruction set architectures (e.g., Intel 64 instruction format). The VEX prefix contains two or three bytes, which are added to existing or new instruction codes. The VEX prefix allows instruction codes to have up to five operands, allows the size of SIMD vector registers to be extended to 256-bits, and allows existing two-operand instructions to be modified into three-operand forms where the destination register is different from the source registers. These new operands may be encoded with 0xC2 or 0xC3 depending on the register combinations in an instruction.

If the Mod RIM field is encoded with a vulnerable value (e.g., 0xC2 or 0xC3), then the instruction can be modified so that the vulnerable value is not present. In some scenarios, alternative encoding can be applied to the instruction such that the source and destination operands are swapped. For example, the d-bit 224 of opcode 220 can be flipped such that the REG subfield 234 and the RIM subfield 236 are swapped. If the REG field (represented by bits 000) and the RIM field 236 (represented by bits 010 or 011) are swapped, then the resulting Mod RIM field would be 1100 1000 (0xC8) or 1100 1100 (0xCC). Thus, the encoding of the instruction is changed without changing its semantics.

Alternative encoding is often possible as a solution for removing vulnerable values from common instructions such as an addition (add) instruction and other common instructions. Consider the following addition instruction: add eax, ebx. The encoding for this instruction is hexadecimal 01 C3, where the opcode field is 0x01 and the Mod RIM field is 0xC3. Embodiments herein can determine a way to achieve the same result of the instruction while preventing 0xC3 from being encoded in the instruction. If the d-bit 224 is flipped, the opcode byte becomes 0x03 and the encoding in the REG field 234 (eax register) and RIM field 236 (ebx register) are swapped. Thus, the Mod RIM field is transformed to 0xD8. The instruction transformation is represented below:

| HEX: | 01 | C3 | 03 | D8 |
|---|---|---|---|---|
| BITS: | 0000 000$\underline{1}$ | 1100 0$\underline{011}$ → | 0000 00$\underline{11}$ | 11$\underline{011}$000 |

In other scenarios, the vulnerable value can be modified by restricting specific register use during register allocation. In at least one example, when a vulnerable value is identified, then a feedback signal can be provided from exploit prevention component 149 to register allocator component 145 to request a change to one of the registers. For example, a request can be made to allocate a different register for a particular value. The change can be requested for either the register indicated in the REG subfield or the register indicated in the RIM subfield. In some implementations, the feedback signal may request that both registers be changed.

In the SIB field 240 of an instruction, particular combinations of registers as a base and an index can lead to the SIB field 240 of an instruction being a 0xC2 or 0xC3 value. For example, a 0xC2 or 0xC3 byte may appear in the SIB field 240 when the two-bit SCALE subfield 242 is set to a bit representation of 11. When SCALE=11, this indicates the index register is to be multiplied by 8. If index subfield 244 points to eax register (having a bit representation of 000) and subbase field 246 points to the edx register (having a bit representation of 010) or to the ebx register (having a bit representation of 011), then the SIB field 240 contains the value of 0xC2 or 0xC3, respectively. In these scenarios, 0xC2 corresponds to (ebx+eax*8) and 0xC3 corresponds to (edx+eax*8).

If the SIB field is encoded with a vulnerable value (e.g., 0xC2 or 0xC3), then the instruction can be modified so that the vulnerable value is not present in the instruction. In some scenarios, the register allocation can be changed and in other scenarios, registers can be swapped to use an alternative register that does not result in a vulnerable value being encoded in the instruction. For example, consider the addition instruction:

add ebx, [edx+eax*8]

This combination of registers results in a 0xC2 value being encoded in the SIB field of the instruction. In a first example, if a new register (e.g., ecx) can be allocated, then a feedback signal can be sent to the register allocator component and the new register (e.g., ecx) is allocated. In this scenario, the instruction can be replaced with the following:

add ebx, [ecx+eax*8]

In this same example, if another register cannot be allocated because all of the registers are being used, one alternative could be to replace the instruction with a sequence that includes exchanging edx with ecx, using ecx where ecx has a value of edx, and then swapping edx and ecx to restore original values:

xchg edx, ecx; (if ecx cannot be used from scratch)
add ebx, [ecx+eax*8]
xchg edx, ecx Specific implementations depend on how register allocation is implemented in the compiler. A compiler (e.g., code generator component 146) can potentially mark vulnerable instructions in the intermediate representation and define preferable registers to be used alternatively. In at least one embodiment, a feedback signal can be sent to the register allocator component 145 to allocate the alternative registers for the instruction.

Similar issues may occur when using other registers for different instructions such as MM2, MM3, XMM2, XMM3, R10, and R11. These registers may be handled in a similar manner. The designated alternative registers, however, may be different.

Case 3

In Case 3, 0xC2 or 0xC3 values may appear in the displacement field 250 of an encoded instruction. In the case of a relative jump (e.g., jcc short branch) or call (e.g., 0xE8 opcode), these bytes can be eliminated by adding no operation (NOP) instructions before the instruction so that the relative offset in the displacement field 250 is modified. Common scenarios include a short branch jump instruction encoded as hexadecimal EB C2 or EB C3, jcc instructions, and call instructions. Adding NOPs can be useful when a vulnerable byte is encoded as the least significant byte (LSB), so that a small shift in offset is needed. For example, consider the jump instruction:

Jmp 0xaaaaaac2

This instruction can be replaced with the following alternative sequence of instructions if the target is located after the jmp instruction:

jmp 0xaaaaaac4
nop
nop

If a vulnerable byte is encoded in a higher byte within the displacement field, then adding many NOP instructions could impact performance because the amount of code may be substantially increased. In these cases, a register may be used to change a relative offset in the instruction to an indirect address. When a vulnerable byte appears in the middle of an offset or address (e.g., for a jump, call, etc.), the offset or address can be built in an extra register (e.g., using move and addition instructions). The instruction can be transformed into using an indirect address for the relative offset. Consider the following jump instruction:

jmp 0xaaaac3aa

This instruction can be replaced with the following alternative sequence of instructions:

mov eax, 0xaaaac0aa
add eax, 0x300
jmp eax

In other scenarios, a target of the jump or call instruction may be moved several bytes away in order to force the value in the displacement field to change. For example, a feedback signal could be sent to the optimizer (e.g., optimizer component 144) with information related to the instruction. The feedback signal could request that the basic block be reordered so that the target address of the instruction has a different address. The reordering needs to be sufficient to cause the vulnerable byte or bytes in the displacement field 250 to be replaced with other non-vulnerable bytes.

Case 4

In Case 4, vulnerable values (e.g., 0xC2 and C3) may appear as operands in the immediate field 260 of an encoded instruction. In these scenarios, the instruction can be replaced with an alternative sequence to prevent the vulnerable value (e.g., 0xC2 or C3), which is an immediate operand in the encoded instruction, from being exploited (e.g., as a ROP exploit). In one example a vulnerable value may be replaced. Consider the following move instruction, to move the value of C3 into the eax register:

mov eax, 0xc3

In this example, the single instruction where the 0xc3 value appears as an immediate operand can be decomposed into two (or more, if needed) instructions. In the two alternative instructions, two immediate operands resulting from the decomposition are used in the two alternative instructions, respectively. For example, the move instruction could be transformed into the following alternative sequence of instructions to achieve the same result:

move eax, 0xc0
add eax, 0x03 (or lea eax, [eax+3])

The lea instruction is another way of adding 3 to register eax. The lea instruction is direct addition and refers to 'load effective address.'

In another example, consider an addition instruction to add 0xABC3 to the value in register ebx:

add ebx, 0xabc3

In this example, the single instruction where the 0xabc3 value appears as an immediate operand can be decomposed into two (or more, if needed) instructions. For example, the add instruction could be transformed into the following alternative sequence to achieve the same result:

add ebx, 0xabc0
add ebx, 0x0003

The decomposition of one instruction into two instructions depends on each instruction. The decomposition for arithmetic-related instructions may seem straightforward, but precautions should be taken around flags. The compiler may use a temporary register to build a value as described above, and then use this register to perform the operation. For example, the addition instruction above (i.e., add ebx, 0abc3) could be replaced with the following to ensure that flags remain equivalent to the original addition instruction:

mov eax, 0xabc0
add eax, 3
add ebx, eax

Certain types of instructions may need to be split into more than two instructions in order to remove the 0xC2 or 0xC3 byte from the encoded instruction. For example, a single division instruction may need more than two instructions to successfully perform the division operation and remove the 0xC2 or 0xC3 byte from the encoded instruction. If the divisor is non-prime, such as 0xc3 (i.e., decimal 195) and the remainder is not used, then a prime number decomposition can be performed without using an extra register: 195=3*5*13, divide first by 15, divide next by 13.

If a divisor is prime, such as 0x7c3 (i.e., numerical 1987), then instead of performing division by a literal, the divisor can be put in an extra register and divided by it. For example, consider the following division instruction where the divisor is 0x7c3 and the dividend is implicit (e.g., ax, dx:ax or edx:eax) depending on the data size of the divisor:

idiv 0x7c3

This division instruction can be split into the following three instructions:

mov ebx, 0x7c0
add ebx, 0x3
idiv ebx

It should be noted that prime number decomposition can also be used in multiplications. While division and multiplication instructions with 0xC3 or 0xC2 in their operands may be transformed into more than two instructions to eliminate the occurrence of 0xC3 or 0xC2, other instructions (e.g., arithmetic, subtraction, etc.) having 0xC3 or 0xC2 in their operands may be transformed into two instructions to eliminate the occurrence of 0xC3 or 0xC2.

Figure 4A:
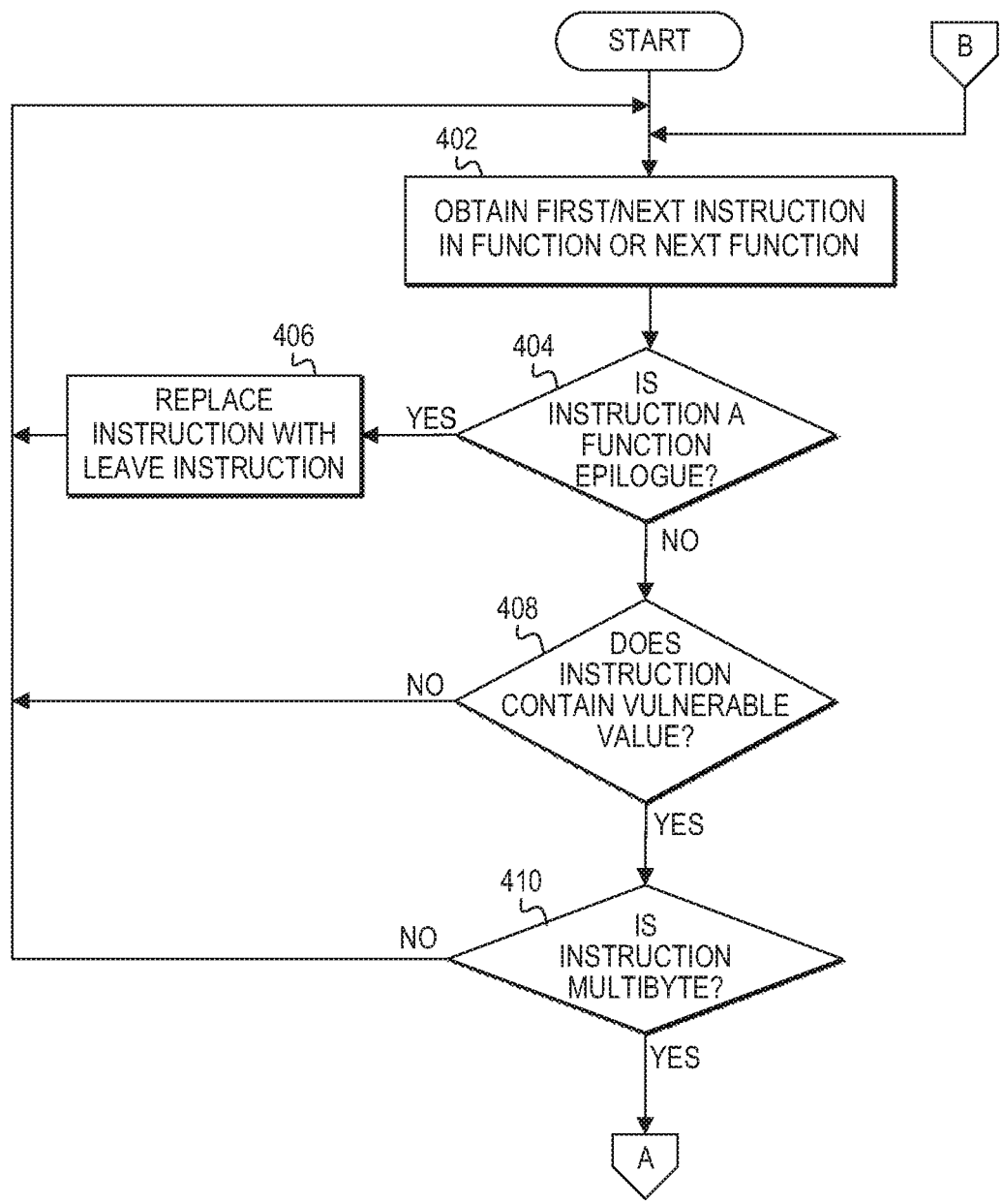
FIGS. 4A-4B show a simplified flowchart of potential operations associated with compiling techniques according to at least one embodiment.
Figure 4B:
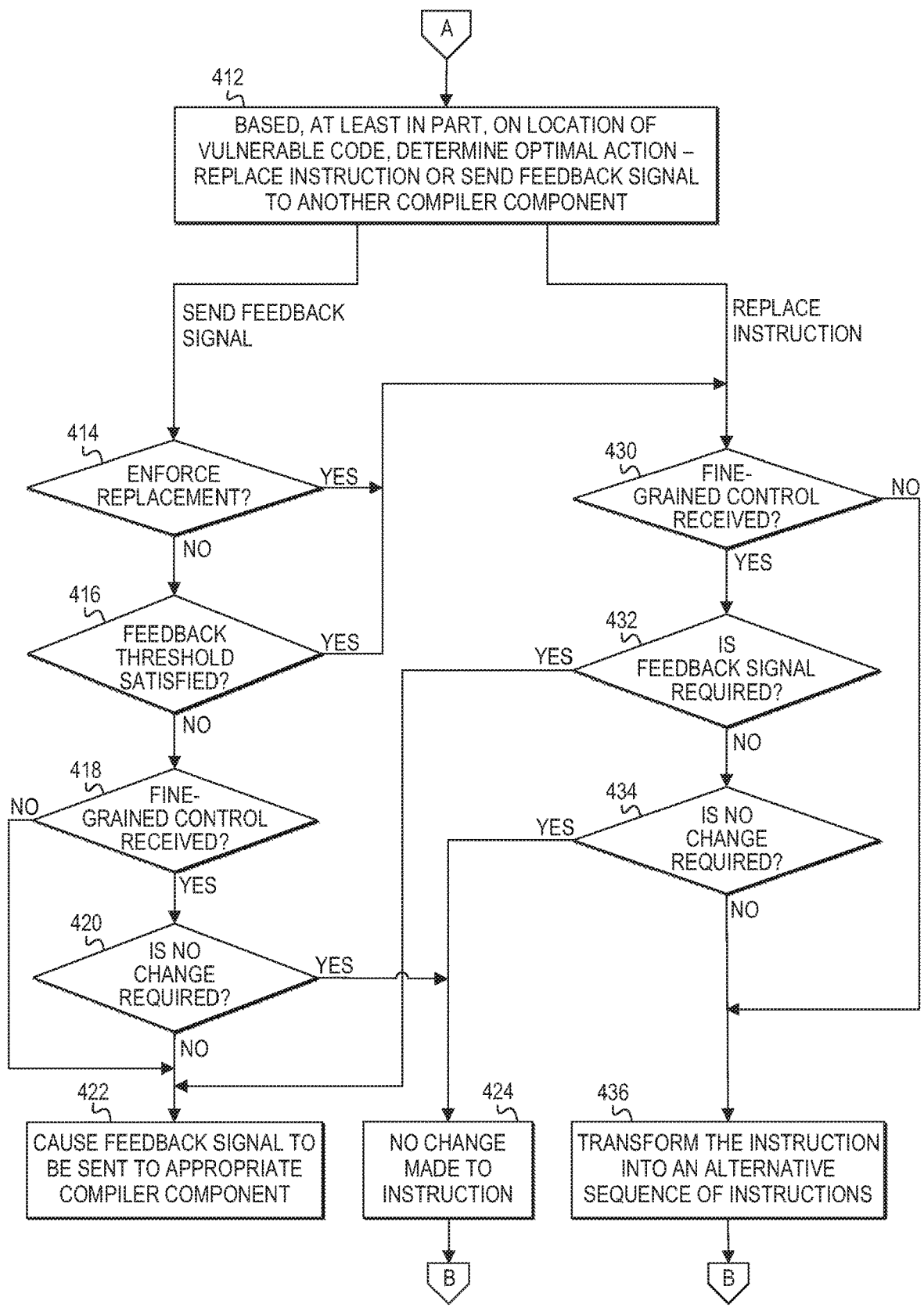

FIGS. 4A-4B illustrate a flowchart showing flows 400A-400B of possible high-level operations that may be associated with one or more embodiments of a compiler system hardening applications against branch programming exploits, as disclosed herein. In FIGS. 4A-4B, flows 400A-400B may be associated with one or more sets of operations. A computing system (e.g., computing system 120) may comprise means such as one or more processors (e.g., 123), for performing the operations. In one example, at least some operations shown in flows 400A-400B may be performed by exploit prevention component 149 of compiler 130. Flows shown in FIGS. 4A-4B may be performed as part of a compiler (e.g., compiler 130) performing a compilation of a software program. The flows of FIGS. 4A-4B may be performed so that the resulting compiled software program is hardened against branching exploits.

At 402, an instruction of a function in a software program being compiled is obtained. For example, exploit prevention component 149 may receive the instruction from instruction selector component 147.

At 404, a determination may be made as to whether the instruction is a function epilogue. If it is determined at 404, that the instruction is a function epilogue, then at 406, the instruction is replaced with a LEAVE instruction before a return instruction. The LEAVE instruction restores the stack pointer, which complicates the use of the return instruction at the function epilogue as part of a gadget. Thus, the return instruction is much more difficult to misappropriate by a malicious user and code. Once the instruction sequence is modified, then flow passes back to 402, where the next instruction in the function is obtained. It should be noted that if the instruction obtained at 402 is the first instruction of a function, then it is not the function epilogue.

If it is determined, at 404, that the instruction is not a function epilogue, then at 408, a determination may be made as to whether the instruction contains a vulnerable value. If it is determined at 408 that the instruction does not contain a vulnerable value, the flow passes back to 402, where the next instruction in the function or next function is obtained.

If it is determined at 408 that the instruction does contain a vulnerable value, then at 410, a determination can be made as to whether the instruction is a multi-byte instruction. If it is determined at 410 that the instruction is not a multi-byte instruction, then flow passes back to 402, where the next instruction in the function or next function is obtained.

If it is determined at 410 that the instruction is a multi-byte instruction, then at 412 of FIG. 4B, the location of the vulnerable value within the instruction (and possibly other information) is used to determine whether the optimal action is to replace the instruction with an alternative sequence of instructions or to send a feedback signal to another compiler component to transform the instruction. Other information can include, for example, whether the d-bit is available (e.g., when the vulnerable value is located in the Mod R/M field), whether the instruction is a jump, call, or jump if condition is met (e.g., when the vulnerable value is located in the displacement field), or whether the instruction is commutative (e.g., when the vulnerable value is in the immediate field). If replacing the instruction is determined to be the optimal action, then flow passes to 430.

If it is determined at 430 that a fine-grained control criterion was not received, then at 436, the instruction is transformed into an alternative sequence of instructions that are semantically equivalent, but that do not contain the vulnerable value detected at 410.

If it is determined at 430 that a fine-grained control criterion was received, then a determination is made as to whether the fine-grained control criterion indicates the feedback signal is required over other actions such as replacing the instruction. A fine-grained control criterion may indicate that a feedback signal is required (e.g., when security is high priority for a particular section of the software program). If it is determined at 432 that the fine-grained control criterion indicates feedback signals are required, then at 422, exploit prevention component can cause a feedback signal to be sent to an appropriate compiler component.

If it is determined at 432 that the fine-grained control criterion does not indicate feedback signals are required, then at 434 a determination is made as to whether the fine-grained control criterion indicates that no change to the instruction is required. If it is determined at 434 that the fine-grained control criterion indicates no change to the instruction is required, then no change is made to the instruction, as shown at 424.

If it is determined that the fine-grained control criterion does not indicate that no change to the instruction is required (or if no fine-grained control criterion is received at 430) then the instruction is transformed into an alternative sequence of instructions that are semantically equivalent, but that do not contain the vulnerable value detected at 410.

At 412, if sending a feedback signal to activate other components of the compiler to transform the instruction is the optimal action for the instruction, then flow passes to 414. At 414, if an enforce replacement criterion is received, then the user or code has indicated that for at least this instruction, replacing the instruction is preferable to sending a feedback signal. Accordingly, flow passes to 430 and proceeds as previously described. It should be noted that a fine-grained control criterion could override the enforce replacement criterion as shown at 432 and 434.

If an enforce replacement criterion is not received, as determined at 414, then at 416, a determination is made as to whether the feedback threshold has been satisfied. If the feedback threshold has not been satisfied at 416, then at 418, a determination is made as to whether a fine-grained control criterion has been received that overrides the optimal action of sending a feedback signal for this instruction. If a fine-grained control criterion has not been received, then at 422, exploit prevention component 149 causes a feedback signal to be sent to the appropriate compiler component.

If a fine-grained control criterion has been received, then at 420, if the fine-grained control criterion requires no change to the instruction, flow passes to 424 and no change is made to the instruction. Otherwise, at 422, exploit prevention component 149 causes a feedback signal to be sent to the appropriate compiler component.

With reference again to 416, if the feedback threshold has been satisfied, then flow passes to 430 to determine whether a fine-grained control criterion has been received that overrides the feedback threshold being satisfied. At 432, this determination is made. If a fine-grained control criterion requires a feedback signal, and therefore overrides the feedback threshold being satisfied, then flow passes to 422, where exploit prevention component 149 causes a feedback signal to be sent to the appropriate compiler component.

If a fine-grained control criterion does not require a feedback signal, and therefore does not override the feedback threshold being satisfied, then exploit prevention component 149 can attempt to replace the instruction at 436, and not send any further feedback signals. In this scenario, the fine-grained control criterion would not require no change because otherwise the criterion would have already been triggered at 420.

Figure 5A:
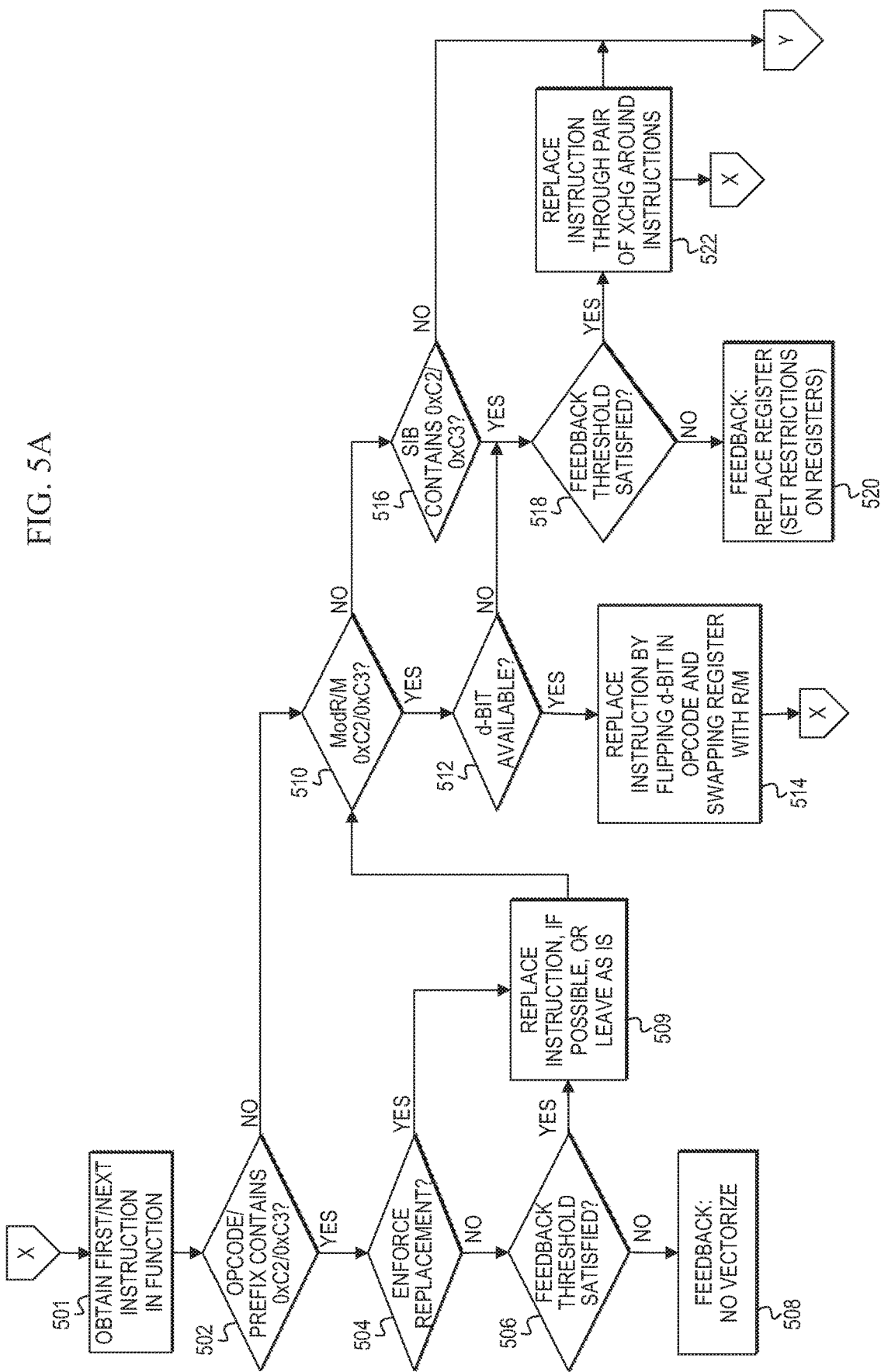
Figure 5B:
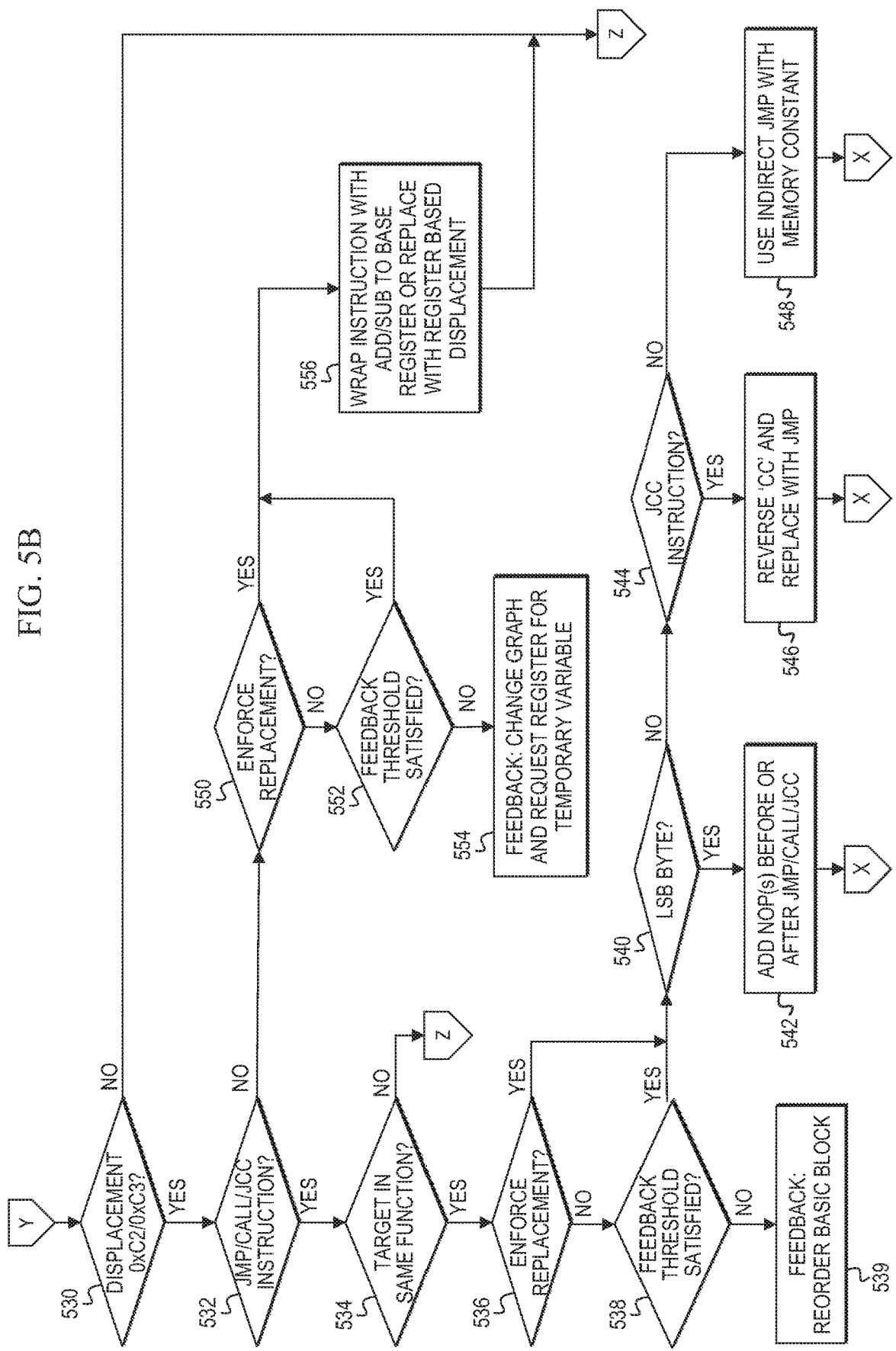

FIGS. 5A-5C illustrate a flowchart showing flows 500A-500C of possible operations for hardening applications against branch programming exploits on a particular architecture, i.e., the Intel® x86 ISA, in accordance with at least one embodiment herein. In FIGS. 5A-5C, flows 500A-500C may be associated with one or more sets of operations. A computing system (e.g., computing system 120) may comprise means such as one or more processors (e.g., 123), for performing the operations. In one example, at least some operations shown in flows 500A-500C may be performed by exploit prevention component 149 of compiler 130. Flows shown in FIGS. 5A-5C may be performed as part of a compiler (e.g., compiler 130) performing a compilation of a software program. The flows of FIGS. 5A-5C may be performed so that the resulting executable file (e.g., 150) is hardened against branching exploits.

For ease of illustration, it should be noted that in flows 500A-500C, references to fine-grained control criteria have been omitted. It should be appreciated, however, that the teachings described herein of fine-grained control criteria, particularly with reference to FIGS. 4A-4B, are applicable to the various analyses performed in flows 500A-500C for each field of an instruction that contains a vulnerable value (e.g., 0xC2, 0xC3).

At 501, a first instruction in a function of a software program being compiled is obtained. At 502, a determination is made as to whether the opcode field 220 contains a vulnerable value, specifically, the hexadecimal value of C2 or C3. If the opcode field contains 0xC2 or 0xC3, then at 504 a determination is made as to whether an enforce replacement criterion has been received. If no enforce replacement criterion was received, then at 506, a determination is made as to whether the feedback threshold has been satisfied. If the feedback threshold has not been satisfied, then at 508, a feedback signal may be sent to an optimizer component (e.g., 144) to request no vectorization of the instruction. Flows 500A-500C end based on the feedback signal being sent, but start again upon receiving a new instruction resulting from the feedback signal.

If the enforce replacement criterion was received or if the feedback threshold has been satisfied, then at 509, the instruction is replaced, if possible, with an alternative sequence of one or more instructions that do not contain the detected vulnerable value. If it is not possible to replace the instruction, then it can remain unchanged and additional analysis is performed.

If the opcode field does not contain a vulnerable value, or if it does contain a vulnerable value and the instruction is replaced or not changed (i.e., no feedback signal was sent), then at 510, a determination is made as to whether the Mod R/M field 230 contains a vulnerable value. If the Mod R/M field contains 0xC2 or 0xC3, then at 512, a determination is made as to whether the d-bit 224 of the opcode field 220 is available. If the d-bit is available and if changing the d-bit prevents 0xC2 and 0xC3 from being encoded in the Mod R/M field of the instruction, then at 514, the instruction is replaced with an alternative sequence of instructions in which the d-bit is flipped (e.g., 0 to 1, 1 to 0) and the reg field 234 and the R/M field 236 are swapped.

If the Mod RIM field does not contain a vulnerable value as determined at 510, then at 516, the next field in the instruction, SIB 240, is analyzed. If the SIB field contains 0xC2 or 0xC3, or if the Mod R/M field contains 0xC2 or 0xC3 but the d-bit is not available, then at 518 a determination is made as to whether the feedback threshold has been satisfied. If the feedback threshold has not been satisfied, then at 520, a feedback signal may be sent to a register allocator component (e.g., 145) to replace the registers allocated for the instruction or to set restrictions on registers allocated for the instruction. Flows 500A-500C end based on the feedback signal being sent, but start again upon receiving a new instruction resulting from the feedback signal.

In one example of 520, for an SIB byte with 0xC2 or 0xC3 encoded in it, the base subfield 246 is either an edx or ebx register, the index subfield 244 is an eax register, and the scale 242 is encoded with bits 11. In this scenario, the feedback signal can request changing eax to another register or changing edx or ebx to another register. An example instruction such as, add eax, [edx+eax*8], could be replaced with:
xchg edx, ecx
add eax, [ecx+eax*8]
xchg edx, ecx In another example of 520, if a Mod RIM field is encoded with 0xC2 or 0xC3 and the d-bit is unavailable, the feedback signal could indicate which registers could not be used for the reg field 234 (e.g., eax) and/or which registers should not be used for the RIM field 236 (e.g., ebx and edx).

If a determination is made at 518 that the feedback threshold is satisfied, then at 522, the instruction may be replaced with an alternative sequence of instructions. In this scenario, for example, if all registers are being used, then the values of one of the registers in the instruction can be exchanged with a third register that is not in the instruction. The third register can be used to complete the desired operation (e.g., add), and then the values in the two registers can be exchanged again to restore the original value to the second register. If the instruction is replaced with an alternative sequence of instructions at 514 or 522, flow passes back to 501, where the next instruction is obtained and processed through flows 500A-500C.

If the SIB field does not contain a vulnerable value as determined at 516, or if the SIB does contain a vulnerable value and the instruction is replaced through a pair of exchange around instructions, then at 530, the next field in the instruction, displacement field 250, is analyzed. If the displacement field contains 0xC2 or 0xC3, a determination is made at 532 as to whether the instruction opcode is jump (JMP), call (CALL), or jump if condition is met (JCC) with a relative offset in the displacement field 250. If it is, then a determination is made at 534 as to whether the target of the instruction is within the same function. If the target is not within the same function, then flow passes to 560 to analyze the next field in the instruction, the immediate field 260.

If a determination is made at 534 that the target of the jmp, call, or jcc instruction is within the same function, then at 536 a determination is made as to whether an enforce replacement criterion has been received. If no enforce replacement criterion was received, then at 538, a determination is made as to whether the feedback threshold has been satisfied. If the feedback threshold has not been satisfied, then at 539, a feedback signal may be sent to an optimizer component (e.g., 144) to request that the basic blocks be reordered. Generally, reordering a basic block or blocks may be requested whenever 0xC2 or 0xC3 is present in the address of a jmp, call, or jcc instruction. If the vulnerable value is the least significant byte (LSB) or close to the LSB, then it may be sufficient to change the offset by simply adding no operation (NOP) instructions before or after the jump instruction, since call/jcc and short jmps use relative addressing rather than absolute addressing. This is described with reference to 542, for example. If the vulnerable value is not the least significant byte (LSB), however, then changing the offset could potentially require a shift of more than 256 bytes, which could bloat the code size. Thus, reordering the blocks may be requested, for example at 539, to maintain a specific constraint like distance between specified blocks. In one example, the reordering could result in replacing the jump instruction so that no branching is even needed. In other examples, where jumps are performed based on conditional loops, the condition may be replaced to swap a branch of code that is running in a different order without changing the semantics. Flows 500A-500C end based on the feedback signal being sent, but start again upon receiving a new instruction resulting from the feedback signal.

If the enforce replacement criterion has not been received or if the feedback threshold has been satisfied, then various operations are performed at 540-548 to generate an appropriate alternative sequence of instructions. If the detected vulnerable value is determined at 540 to be the least significant byte (LSB) of the displacement field, then at 542, one or more no operation (NOP) instructions may be added before or after the jmp, call, or jcc instruction. This can force the displacement value to be changed.

If it is determined that the vulnerable value is not the LSB, then a determination may be made at 544 as to whether the instruction is a jcc instruction. If it is, then at 546, the condition of the jump can be reversed or otherwise appropriately changed (e.g., by resolving the condition) and the jcc instruction can be replaced with a jmp instruction. An example is an instruction like, jz target, (jump if zero), which could be replaced with:

jnz @@; (jump if not zero)
jmp target
@@:

If the instruction is determined to not be a jcc instruction, then at 548, an indirect jmp instruction with a memory constant can be used to replace the instruction. If the instruction is replaced with an alternative sequence of instructions at 542, 546, or 548, flow passes back to 501, where the next instruction is obtained and processed through flows 500A-500C.

If a determination is made that the instruction is not a jmp, call, or jcc instruction, then at 550 a determination is made as to whether an enforce replacement criterion has been received. If no enforce replacement criterion was received, then at 552, a determination is made as to whether the feedback threshold has been satisfied. If the feedback threshold has not been satisfied, then at 554, a feedback signal may be sent to a register allocator component (e.g., 145) indicating a change in the graph of data and control flow and requesting a register to be allocated for a temporary variable. The graph can be changed by adding a new node that computes results containing a 0xC2/0xC3 byte from data that does not contain the byte and stores the computed value in a specific register. For example, in an original operation of $T1=T0+0xC2$, the temporal variable of $T1$ and $T0$ may be mapped to registers in the new code:

$T2=0xC1$ $T3=T2+1$ (now $T3$ contains $0xC2$)

$T1=T0+T3$

Flows 500A-500C end based on the feedback signal being sent, but start again upon receiving a new instruction resulting from the feedback signal.

If the enforce replacement criterion was received or if the feedback threshold has been satisfied, then at 556, the instruction may be replaced with an alternative sequence of instructions. In one example, the instruction is wrapped with instructions for addition and/or subtraction to the base register. In another example, the register in the instruction is replaced with register-based displacement. An example can be an instruction like, add ebx, [ecx+0xabc3], which can be replaced with:

mov eax, [0xabc0]
add eax,3
add ebx, [ecx+eax]

Another example can be an instruction like, add eax, [edx+0xC3], which can be replaced with:

lea edx, [edx+3]
add eax, [edx+0xC0]
lea edx, [edx−3]

If the displacement field does not contain a vulnerable value as determined at 530, or if the instruction is replaced at 556, then at 560, the next field in the instruction, immediate field 260, is analyzed. If the immediate field contains 0xC2 or 0xC3, then a determination is made as to whether the instruction or usage is arithmetically commutative and associative. If it is commutative and associative, then at 564, the instruction can be replaced with a pair of semantically same instructions. For example, an add instruction may be replaced by two add instructions so that the problematic value being added (e.g., 0xC2 or 0xC3) is decomposed into two different values that are individually added to achieve the same end result. In another example, a move instruction may be replaced by a move instruction and an add instruction, where the problematic value being moved (e.g., 0xC2 or 0xC3) is decomposed into two different values. For example, 0xC3 could be decomposed into 0xC0 and 3. One of the values is moved into the register, and the other value is added to the register to achieve the same end result in the register. If the instruction is replaced with an alternative sequence of instructions at 564, flow passes back to 501, where the next instruction is obtained and processed through flows 500A-500C.

If the immediate field contains 0xC2 or 0xC3, but the instruction or usage is not cumulative, then at 566 a determination is made as to whether an enforce replacement criterion has been received. If no enforce replacement criterion was received, then at 568, a determination is made as to whether the feedback threshold has been satisfied. If the feedback threshold has not been satisfied, then at 570, a feedback signal may be sent to a register allocator component (e.g., 145) indicating a change in the graph of data and control flow and requesting a register to be allocated for a temporary variable.

In an example, if the instruction is division and the divisor is a prime number, then the feedback signal may request a register for intermediate results where the divisor is put into the register and then division is performed by the register rather than a literal. In another example, if an instruction uses flags, then the feedback signal may request a register to build a value and then use the register to perform the operation intended by the instruction. The register allocator component and instruction selection may generate this alternative sequence of instructions in at least some scenarios.

In at least one embodiment, an optimizer component may determine whether invoking the register allocator component to allocate a register, or generating alternative instructions by exploit prevention component, is more cost efficient. Thus, the determination as to which approach is to be taken may be determined by an optimizer component in the compiler. Flows 500A-500C end based on the feedback signal being sent, but start again upon receiving a new instruction resulting from the feedback signal.

If the enforce replacement criterion was received as determined at 566 or if the feedback threshold was satisfied as determined at 568, then at 572, the instruction is replaced with an alternative sequence of instructions. For example, the instruction may be replaced with a spilling register, a value may be formed in the register, and then the register may be restored. For example, a feedback signal may not be sent for a division instruction and instead, an alternative sequence of instructions could be generated by the exploit prevention component. For example, the value of a register to be used in the alternative sequence of instructions can be stored on stack, the register can be modified, and the register can be popped to restore the original value of the register. An example could be an instruction like, idiv eax, 0xC3, which could be replaced with:

push ebx
  mov ebx, 0xC0
  add ebx, 3
  idiv ebx
  pop ebx

If the instruction is replaced with an alternative sequence of instructions at 564 or 572, flow passes back to 501, where the next instruction is obtained and processed through flows 500A-500C.

Figure 6:
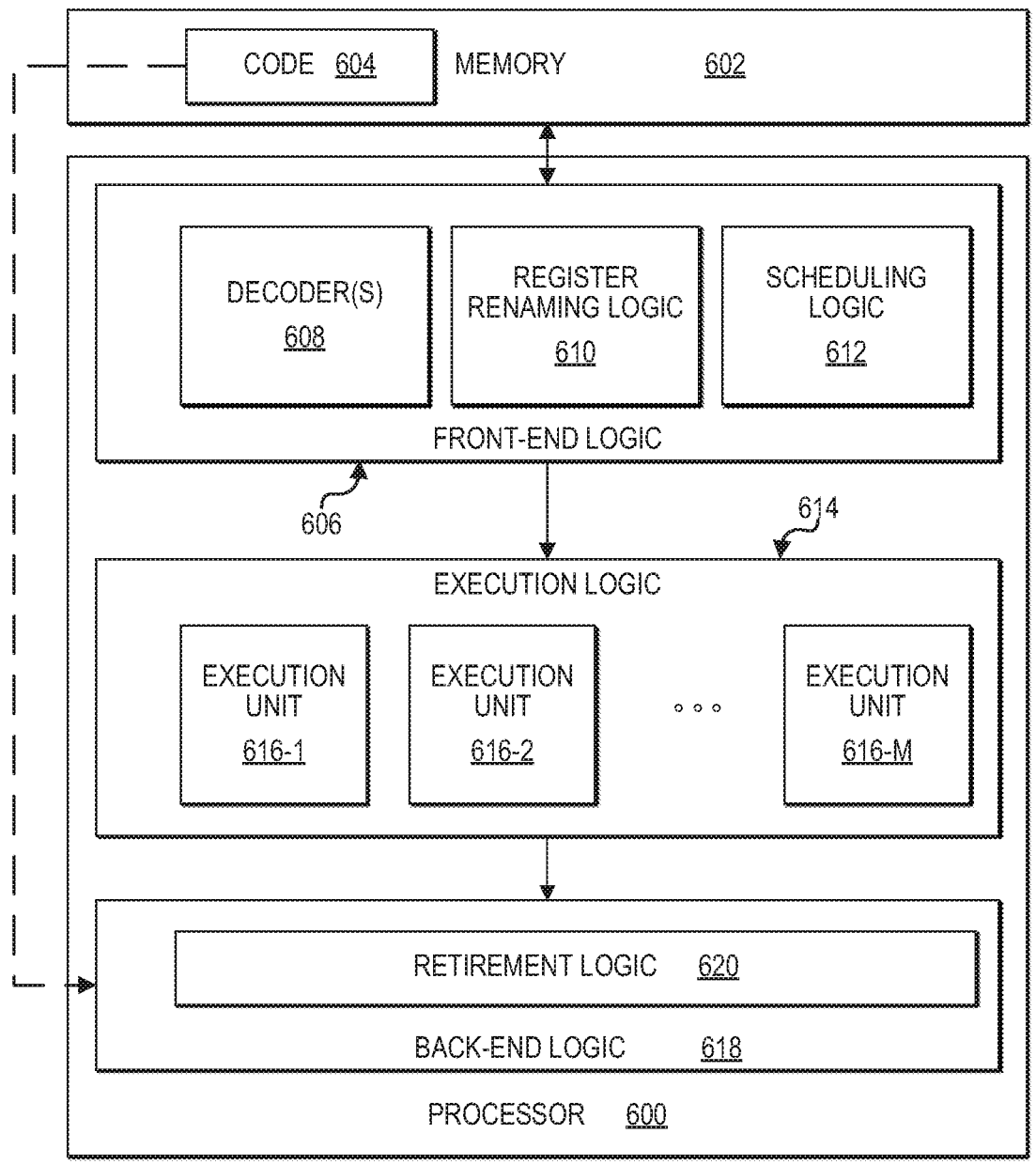
FIG. 6 is a block diagram of a memory coupled to an example processor according to at least one embodiment.

FIG. 6 is an example illustration of a processor according to an embodiment.

Processor 600 is one possible embodiment of processor 123 of computing system 120. Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 is one embodiment of memory element 125 of computing system 120 and computing system 800. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Code 604, which may be one or more instructions to be executed by processor 600, may be stored in memory 602. Code 604 can include instructions of various logic and components (e.g., compiler 130, front end 132, middle end 134, back end 140, analyzer component 142, optimizer component 144, code generator component 146, register allocator component 145, instruction selector component 147, exploit prevention component 149, etc.) that may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units 616-1 through 616-M. Some embodiments may include a number of execution units dedicated to specific functions or sets of functions. Other embodiments may include only one execution unit or one execution unit that can perform a particular function. Execution logic 614 can perform the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

Figure 7:
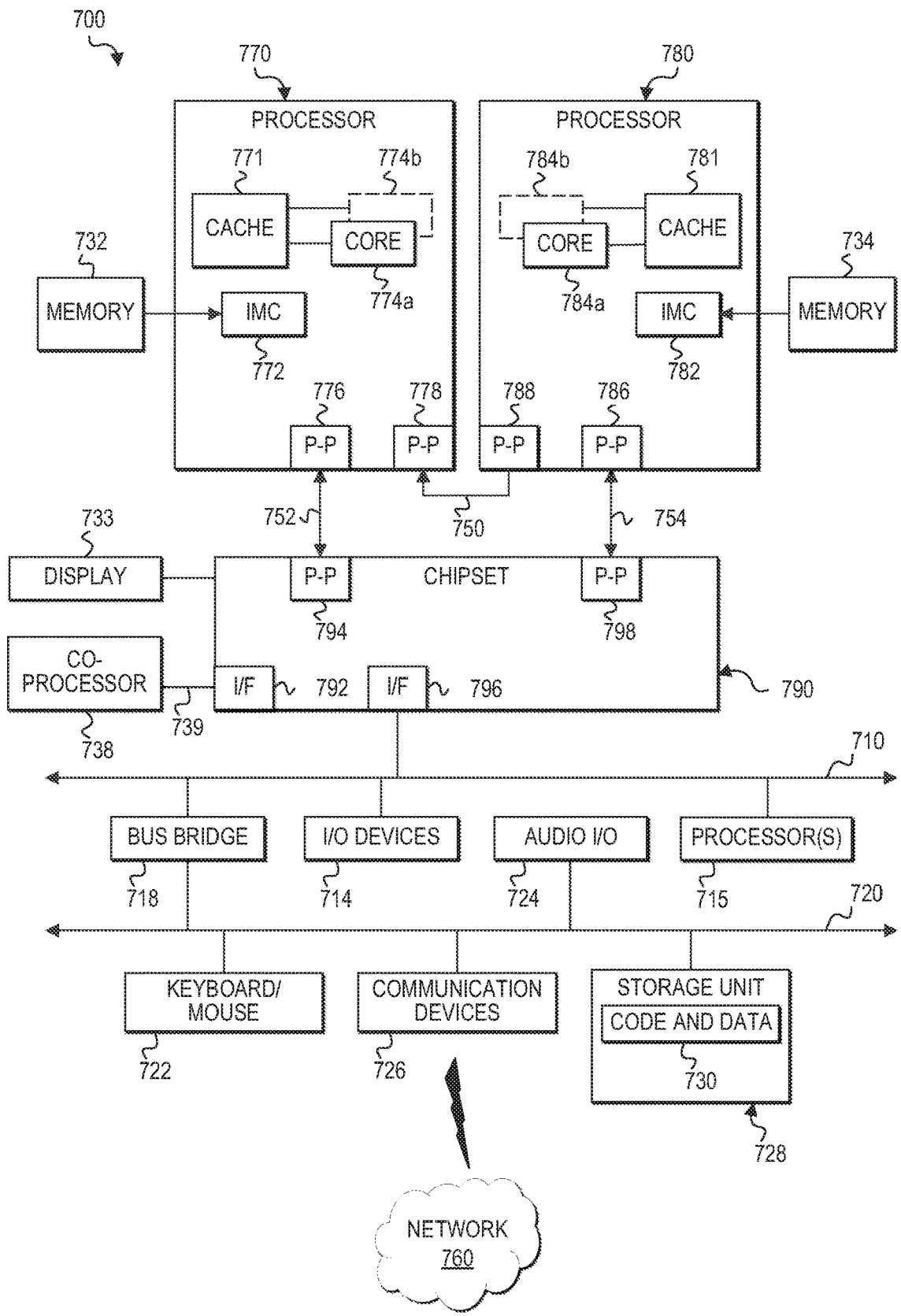
FIG. 7 is a block diagram of an example computing system that is arranged in a point-to-point (PtP) configuration according to at least one embodiment.

FIG. 7 illustrates one possible example of a computing system 700 that is arranged in a point-to-point (PtP) configuration according to an embodiment. In particular, FIG. 7 shows a system where processors, memory, and input/output devices are interconnected by a number of point-to-point interfaces. In at least one embodiment, computing system 120, shown and described herein, may be configured in the same or similar manner as exemplary computing system 700.

Processors 770 and 780 may also each include integrated memory controller logic (MC) 772 and 782 to communicate with memory elements 732 and 734. In alternative embodiments, memory controller logic 772 and 782 may be discrete logic separate from processors 770 and 780. Memory elements 732 and/or 734 may store various data to be used by processors 770 and 780 in achieving operations associated with hardening applications against branch programming exploits, as outlined herein.

Processors 770 and 780 may be any type of processor, such as those discussed with reference to processor 600 of FIG. 6, and processor 123 of FIG. 1. Processors 770 and 780 may exchange data via a point-to-point (PtP) interface 750 using point-to-point interface circuits 778 and 788, respectively. Processors 770 and 780 may each exchange data with a control logic 790 via individual point-to-point interfaces 752 and 754 using point-to-point interface circuits 776, 786, 794, and 798. As shown herein, control logic is separated from processing elements 770 and 780. However, in an embodiment, control logic 790 is integrated on the same chip as processing elements 770 and 780. Also, control logic 790 may be partitioned differently with fewer or more integrated circuits. Additionally, control logic 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link. Control logic 790 may also communicate with a display 733 for displaying data that is viewable by a human user.

Control logic 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a keyboard/mouse 712 (or other input devices such as a touch screen, trackball, joystick, etc.), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computing system depicted in FIG. 7 is a schematic illustration of an embodiment that may be utilized to implement various embodiments discussed herein. It will be appreciated that various components of the system depicted in FIG. 7 may be combined in a system-on-a-chip (SoC) architecture or in any other suitable configuration capable of using compiling techniques for hardening applications against branch programming exploits, according to the various embodiments provided herein.

Figure 8:
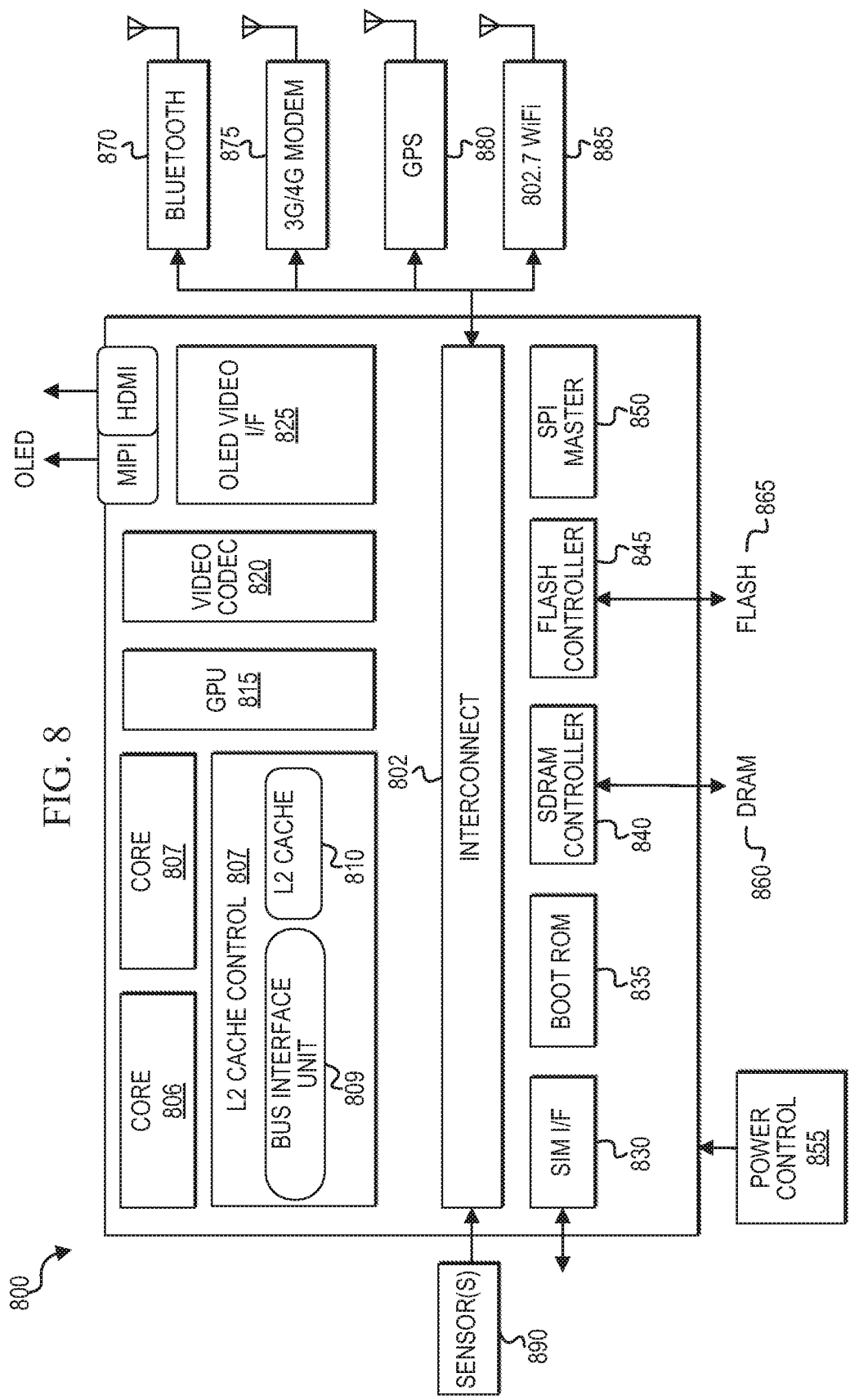
FIG. 8 is a simplified block diagram associated with an example ARM ecosystem system on chip (SOC) according to at least one embodiment.

Turning to FIG. 8, FIG. 8 is a simplified block diagram associated with an example ARM ecosystem SOC 800 of the present disclosure. At least one example implementation of the present disclosure can include the compiling techniques for hardening applications against branch programming exploits discussed herein and an ARM component. For example, in at least some embodiments, computing system 120, shown and described herein, could be configured in the same or similar manner ARM ecosystem SOC 800. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 8, ARM ecosystem SOC 800 may include multiple cores 806-807, an L2 cache control 808, a bus interface unit 809, an L2 cache 810, a graphics processing unit (GPU) 815, an interconnect 802, a video codec 820, and an organic light emitting diode (OLED) I/F 825, which may be associated with mobile industry processor interface (MIPI)/high-definition multimedia interface (HDMI) links that couple to an OLED display.

ARM ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more example embodiments include one or more communication capabilities, interfaces, and features such as instances of Bluetooth™ 870, a 3G modem 875, a global positioning system (GPS) 880, and an 802.11 Wi-Fi 885.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Regarding possible internal structures associated with computing system 120, a processor is connected to a memory element, which represents one or more types of memory including volatile and/or nonvolatile memory elements for storing data and information, including instructions, logic, and/or code, to be used in the operations outlined herein. Computing system 120 may keep data and information in any suitable memory element (e.g., static random access memory (SRAM), dynamic random access memory (DRAM), read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, an application specific integrated circuit (ASIC), or other types of nonvolatile machine-readable media that are capable of storing data and information), software, hardware, firmware, or in any other suitable component, device, element, or object where appropriate and based on particular needs. Any of the memory items discussed herein (e.g., memory elements 125, 602, 732, 734, 728, 807, 860, etc.) should be construed as being encompassed within the broad term 'memory element.' Moreover, the information being used, tracked, sent, or received in computing system 120 could be provided in any storage structure including, but not limited to, a repository, database, register, queue, table, cache, etc., all of which could be referenced at any suitable timeframe. Any such storage structures may also be included within the broad term 'memory element' as used herein.

In an example implementation, computing system 120 includes software to achieve (or to foster) the compiling techniques for hardening applications against branch programming exploits, as outlined herein. In some embodiments, these compiling techniques may be carried out by hardware and/or firmware, implemented externally to these elements, or included in some other computing system to achieve the intended functionality. These elements may also include software (or reciprocating software) that can coordinate with other network elements or computing systems in order to achieve the intended functionality, as outlined herein. In still other embodiments, one or several elements may include any suitable algorithms, hardware, software, components, modules, interfaces, or objects that facilitate the operations thereof. Modules may be suitably combined or partitioned in any appropriate manner, which may be based on particular configuration and/or provisioning needs.

In certain example implementations, the functions outlined herein may be implemented by logic encoded in one or more tangible media (e.g., embedded logic provided in an ASIC, digital signal processor (DSP) instructions, hardware instructions and/or software (potentially inclusive of object code and source code) to be executed by a processor, or other similar machine, etc.), which may be inclusive of non-transitory computer-readable media. In an example, computing system 120 may include one or more processors (e.g., processors 123, 600, 770, 780, 806, 807) that are communicatively coupled to memory elements and that can execute logic or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, agents, engines, managers, modules, and machines described herein should be construed as being encompassed within the broad term 'processor.'

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of two, three, or more computing systems (e.g., computing system 120). However, this has been done for purposes of clarity and example only. In certain cases, it may be easier to describe one or more of the functionalities of a given set of flows by only referencing a limited number of computing systems, endpoints, and servers. Moreover, the system for using compiling techniques for hardening applications against branch programming exploits is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

It is also important to note that the operations in the preceding flowcharts and diagrams illustrating interactions (i.e., FIGS. 3-5C), illustrate only some of the possible compiling activities that may be executed by, or within, the computing system 120 using compiling techniques for hardening applications against branch programming exploits. Some of these operations may be deleted or removed where appropriate, or these operations may be modified or changed considerably without departing from the scope of the present disclosure. In addition, the timing of these operations may be altered considerably. For example, the timing and/or sequence of certain operations may be changed relative to other operations to be performed before, after, or in parallel to the other operations, or based on any suitable combination thereof. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

As used herein, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and Y, but not Z; 5) at least one X and Z, but not Y; 6) at least one Y and Z, but not X; or 7) at least one X, at least one Y, and at least one Z. Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Other Notes and Examples

The following examples pertain to embodiments in accordance with this specification. Example A1 provides an apparatus, a system, one or more machine readable storage mediums, a method, and/or hardware-, firmware-, and/or software-based logic, where the Example of A1 includes obtaining a first encoded instruction of a software program, the first encoded instruction including a first opcode in a first field to be performed when the first encoded instruction is executed; identifying a vulnerable value in a second field within the first encoded instruction, where the vulnerable value includes a second opcode; determining that the first encoded instruction can be replaced with one or more alternative encoded instructions that do not contain the vulnerable value; and replacing the first encoded instruction with the one or more alternative encoded instructions.

In Example A2, the subject matter of Example A1 can optionally include where the second opcode corresponds to one of a return operation, a jump operation, or a call operation.

In Example A3, the subject matter of any one of Examples A1-A2 can optionally include where the one or more alternative encoded instructions is semantically equivalent to the first encoded instruction.

In Example A4, the subject matter of any one of Examples A1-A3 can optionally include where replacing the first encoded instruction with the one or more alternative encoded instructions includes swapping a first operand of the first encoded instruction corresponding to a source register with a second operand of the first encoded instruction corresponding to a destination register; and changing a bit in the first encoded instruction that indicates which operand corresponds to the source register and which operand corresponds to the destination register.

In Example A5, the subject matter of any one of Examples A1-A3 can optionally include where replacing the first encoded instruction with the one or more alternative encoded instructions includes inserting, before the first encoded instruction, a second encoded instruction to exchange a first value in a first register with a second value in a second register, replacing the first register in the first encoded instruction with the second register, and inserting, after the first encoded instruction, a third encoded instruction to exchange the second value in the first register with a current value in the second register.

In Example A6, the subject matter of any one of Examples A1-A3 can optionally include where replacing the first encoded instruction with the one or more alternative encoded instructions includes determining that a value in the second field of the first encoded instruction represents a relative offset to a target address, determining that the vulnerable value is the least significant byte in the second field, inserting one or more no operation instructions, and modifying the relative offset based on the one or more no operation instructions.

In Example A7, the subject matter of any one of Examples A1-A3 can optionally include where replacing the first encoded instruction with the one or more alternative encoded instructions includes determining that, when executed by a processor, the first opcode causes the processor to access an address associated with a value in the second field based on a condition being met, resolving the condition, and replacing the first encoded instruction with a second encoded instruction that does not include the condition and, when executed by the processor, causes the processor to access the address.

In Example A8, the subject matter of Example A7, can optionally include where the vulnerable value is not the least significant byte in the second field.

In Example A9, the subject matter of any one of Examples A1-A3 can optionally include where replacing the first encoded instruction with the one or more alternative encoded instructions includes determining that a value encoded in the second field represents a relative offset to a target address, determining that the vulnerable value is not the least significant byte in the second field, and transforming the first encoded instruction to use an indirect address for the relative offset.

In Example A10, the subject matter of Example A9 can optionally include where replacing the first encoded instruction with the one or more alternative encoded instructions includes storing the relative offset in a register, where an address of the register is encoded in the second field of the transformed first encoded instruction.

In Example A11, the subject matter of any one of Examples A1-A3 can optionally include where replacing the first encoded instruction with the one or more alternative encoded instructions includes determining that the second field of the first encoded instruction includes an immediate operand, and decomposing the immediate operand into two or more immediate operands, where the two or more immediate operands are encoded in two or more of the alternative encoded instructions, respectively.

In Example A12, the subject matter of any one of Examples A1-A11 can optionally include where the first encoded instruction is replaced with the one or more alternative encoded instructions based, at least in part, on determining that an enforce replacement criterion applies to the first encoded instruction to prevent a feedback signal from being sent to a compiler component.

In Example A13, the subject matter of any one of Examples A1-A12 can optionally include where the first encoded instruction is replaced with the one or more alternative encoded instructions based, at least in part, on determining that a feedback threshold has been satisfied.

The following examples pertain to embodiments in accordance with this specification. Example B1 provides an apparatus, a system, one or more machine readable storage mediums, a method, and/or hardware-, firmware-, and/or software-based logic, where the Example of B1 includes obtaining a first encoded instruction of a software program, the first encoded instruction including a first opcode to be performed when the first encoded instruction is executed, identifying a vulnerable value in a location within the first encoded instruction, where the vulnerable value includes a second opcode, identifying an action to be performed to generate a second encoded instruction that does not contain the second opcode, and sending a feedback signal to a compiler component based on the identified action, the feedback signal indicating the action to be performed.

In Example B2, the subject matter of B1 can optionally include where the action is to be performed on an intermediate representation (IR) of the first encoded instruction.

In Example B3, the subject matter of any one of Examples B1-B2 can optionally include where the feedback signal is sent to the compiler component based, at least in part, on determining that a feedback threshold has not been satisfied.

In Example B4, the subject matter of any one of Examples B1-B2 can optionally include determining that a feedback threshold has been satisfied, where the feedback signal is sent to the compiler component based on determining that a fine-grained control criterion overrides the determination that the feedback threshold has been satisfied.

In Example B5, the subject matter of any one of Examples B1-B4 can optionally include where the action is identified based, at least in part, on the location of the vulnerable value within the first encoded instruction.

In Example B6, the subject matter of Example B5 can optionally include where the identified action is to prevent vectorization of the second encoded instruction.

In Example B7, the subject matter of Example B5 can optionally include where the identified action is to replace a register encoded in the first encoded instruction with a different register to be encoded in the second encoded instruction.

In Example B8, the subject matter of Example B5 can optionally include where the identified action is to reorder a basic block of code associated with the first encoded instruction.

In Example B9, the subject matter of Example B5 can optionally where the identified action is to allocate a register to hold a temporary variable.

In Example B10, the subject matter of Example B5 can optionally include determining the location of the vulnerable value is in one of a Mod R/M field, a scale index base (SIB) field, a displacement field, and an immediate field.

In Example B11, the subject matter of any one of Examples B1-B10 can optionally include where the feedback signal includes one or more restrictions related to allocating registers for the second encoded instructions.

In Example B12, the subject matter of any one of Examples B1-B11 can optionally include where the second opcode corresponds to one of a return operation, a jump operation, or a call operation.

In Example B13, the subject matter of any one of Examples B1-B11 can optionally include where the feedback signal includes signal data indicating at least one of a location of the vulnerable value, a type of the feedback signal, and one or more specific registers.

In Example B14, the subject matter of any one of Examples B1-B12 can optionally include, based on sending a feedback signal to the compiler component, aborting execution of an exploit prevention component that identified the vulnerable value.

An Example X1 provides an apparatus, the apparatus comprising means for performing the method of any one of the preceding examples.

In Example X2, the subject matter of Example X1 can optionally include that the means for performing the method comprises at least one processor and at least one memory element.

In Example X3, the subject matter of Example X2 can optionally include that the at least one memory element comprises machine readable instructions that when executed, cause the apparatus to perform the method of any one of the Examples A1-A13 or B1-B14.

In Example X4, the subject matter of any one of Examples X1-X3 can optionally include that the apparatus is one of a computing system or a system-on-a-chip.

Example Y1 provides at least one machine readable storage medium comprising instructions, where the instructions when executed realize an apparatus or implement a method in any one of the Examples A1-A13 or B1-B14.

What is claimed is:

1. At least one non-transitory machine readable storage medium comprising code for execution that when executed by one or more processors, causes the one or more processors to:
    obtain a first encoded instruction of a software program, the first encoded instruction including a first opcode in a first field to be performed when the first encoded instruction is executed;
    identify a vulnerable value in a second field of the first encoded instruction, wherein the vulnerable value includes a second opcode;
    determine that the first encoded instruction can be replaced with one or more alternative encoded instructions that do not contain the vulnerable value; and
    replace the first encoded instruction with the one or more alternative encoded instructions, wherein replacing the first encoded instruction with the one or more alternative encoded instructions is to include:
        swapping a first operand of the first encoded instruction corresponding to a source register with a second operand of the first encoded instruction corresponding to a destination register; and
        changing a bit in the first encoded instruction that indicates which operand corresponds to the source register and which operand corresponds to the destination register.

2. The at least one non-transitory machine readable storage medium of claim 1, wherein the second opcode is associated with one of a return operation, a jump operation, or a call operation.

3. The at least one non-transitory machine readable storage medium of claim 1, wherein the one or more alternative encoded instructions is semantically equivalent to the first encoded instruction.

4. The at least one non-transitory machine readable storage medium of claim 1, wherein the code, when executed by the one or more processors, causes the one or more processors to:
    obtain a second encoded instruction of the software program including a third opcode to be performed when the second encoded instruction is executed;
    identify a second vulnerable value within the second encoded instruction, wherein the second vulnerable value includes a fourth opcode; and
    replace the second encoded instruction with one or more other alternative encoded instructions that do not contain the second vulnerable value, by:
        inserting, before the second encoded instruction, a third encoded instruction to exchange a first value in a first register with a second value in a second register;
        replacing a first register operand corresponding to the first register in the second encoded instruction with a second register operand corresponding to the second register; and
        inserting, after the second encoded instruction, a fourth encoded instruction to exchange the second value in the first register with a current value in the second register.

5. The at least one non-transitory machine readable storage medium of claim 1, wherein the code, when executed by the one or more processors, causes the one or more processors to:
    obtain a second encoded instruction of the software program including a third opcode to be performed when the second encoded instruction is executed;
    identify a second vulnerable value within the second encoded instruction, wherein the second vulnerable value includes a fourth opcode; and
    replace the second encoded instruction with one or more other alternative encoded instructions that do not contain the second vulnerable value, by:
        determining that a value in one field of the second encoded instruction represents a relative offset to a target address;
        determining that the second vulnerable value is the least significant byte in another field of the second encoded instruction;
        inserting one or more no operation instructions; and
        modifying the relative offset based on the one or more no operation instructions.

6. The at least one non-transitory machine readable storage medium of claim 1, wherein the code, when executed by the one or more processors, causes the one or more processors to:

obtain a second encoded instruction of the software program including a third opcode to be performed when the second encoded instruction is executed;

identify a second vulnerable value in a particular field of the second encoded instruction, wherein the second vulnerable value includes a fourth opcode; and replace the second encoded instruction with one or more other alternative encoded instructions that do not contain the second vulnerable value, by:

determining that, when executed by the processor, the third opcode causes the processor to access an address associated with a value in the particular field of the second encoded instruction based on a condition being met;

resolving the condition; and replacing the second encoded instruction with a second third encoded instruction that does not include the condition and, when executed by the processor, causes the processor to access the address.

7. The at least one non-transitory machine readable storage medium of claim 6, wherein the second vulnerable value is not the least significant byte in the particular field of the second encoded instruction.

8. The at least one non-transitory machine readable storage medium of claim 1, wherein the code, when executed by the one or more processors, causes the one or more processors to:

obtain a second encoded instruction of the software program including a third opcode to be performed when the second encoded instruction is executed;

identify a second vulnerable value within the second encoded instruction, wherein the second vulnerable value includes a fourth opcode; and replace the second encoded instruction with one or more other alternative encoded instructions that do not contain the second vulnerable value, by:

determining that a value encoded in a particular field of the second encoded instruction represents a relative offset to a target address;

determining that the second vulnerable value is not the least significant byte in the particular field of the second encoded instruction; and transforming the second encoded instruction to use an indirect address for the relative offset.

9. The at least one non-transitory machine readable storage medium of claim 8, wherein to replace the second encoded instruction with the one or more other alternative encoded instructions includes:

storing the relative offset in a register, wherein an address of the register is encoded in the particular field of the transformed second encoded instruction.

10. The at least one non-transitory machine readable storage medium of claim 1, wherein the code, when executed by the one or more processors, causes the one or more processors to:

obtain a second encoded instruction of the software program including a third opcode to be performed when the second encoded instruction is executed;

identify a second vulnerable value in a particular field of the second encoded instruction, wherein the second vulnerable value includes a fourth opcode; and replace the second encoded instruction with one or more other alternative encoded instructions that do not contain the second vulnerable value, by:

determining that the particular field of the second encoded instruction includes an immediate operand; and decomposing the immediate operand into two or more immediate operands, wherein the two or more immediate operands are encoded in two or more of the other alternative encoded instructions, respectively.

11. The at least one non-transitory machine readable storage medium of claim 1, wherein the first encoded instruction is replaced with the one or more alternative encoded instructions based, at least in part, on determining that an enforce replacement criterion applies to the first encoded instruction to prevent a feedback signal from being sent to a compiler component.

12. The at least one non-transitory machine readable storage medium of claim 1, wherein the first encoded instruction is replaced with the one or more alternative encoded instructions based, at least in part, on determining that a feedback threshold has been satisfied.

13. An apparatus, the apparatus comprising:

at least one processor coupled to a memory, the processor configured to execute code stored in the memory to:

obtain a first encoded instruction of a software program, the first encoded instruction including a first opcode in a first field to be performed when the first encoded instruction is executed;

identify a vulnerable value in a second field of the first encoded instruction, wherein the vulnerable value includes a second opcode;

determine that the first encoded instruction can be replaced with one or more alternative encoded instructions that do not contain the vulnerable value; and replace the first encoded instruction with the one or more alternative encoded instructions, wherein replacing the first encoded instruction with the one or more alternative encoded instructions is to include:

swapping a first operand of the first encoded instruction corresponding to a source register with a second operand of the first encoded instruction corresponding to a destination register; and changing a bit in the first encoded instruction that indicates which operand corresponds to the source register and which operand corresponds to the destination register.

14. The apparatus of claim 13, wherein the second opcode is associated with one of a return operation, a jump operation, or a call operation.

15. The apparatus of claim 13, wherein the one or more alternative encoded instructions is semantically equivalent to the first encoded instruction.

16. The apparatus of claim 13, wherein the processor is configured to execute the code stored in the memory further to:

obtain a second encoded instruction of the software program including a third opcode to be performed when the second encoded instruction is executed;

identify a second vulnerable value within the second encoded instruction, wherein the second vulnerable value includes a fourth opcode; and replace the second encoded instruction with one or more other alternative encoded instructions that do not contain the second vulnerable value, by:

inserting, before the second encoded instruction, a third encoded instruction to exchange a first value in a first register with a second value in a second register;

replacing a first register operand corresponding to the first register in the second encoded instruction with a second register operand corresponding to the second register; and inserting, after the second encoded instruction, a fourth encoded instruction to exchange the second value in the first register with a current value in the second register.

17. The apparatus of claim 13, wherein the processor is configured to execute the code stored in the memory to:
obtain a second encoded instruction of the software program including a third opcode to be performed when the second encoded instruction is executed;
identify a second vulnerable value within the second encoded instruction, wherein the second vulnerable value includes a fourth opcode; and
replace the second encoded instruction with one or more other alternative encoded instructions that do not contain the second vulnerable value, by;
determining that a value in one field of the second encoded instruction represents a relative offset to a target address;
determining that the second vulnerable value is the least significant byte in another field of the second encoded instruction;
inserting one or more no operation instructions; and
modifying the relative offset based on the one or more no operation instructions.

18. A method, the method comprising:
obtaining a first encoded instruction of a software program, the first encoded instruction including a first opcode in a first field to be performed when the first encoded instruction is executed;
identifying a vulnerable value in a second field of first encoded instruction, wherein the vulnerable value includes a second opcode;
determining that the first encoded instruction can be replaced with one or more alternative encoded instructions that do not contain the vulnerable value; and
replacing the first encoded instruction with the one or more alternative encoded instructions, including:
swapping a first operand of the first encoded instruction corresponding to a source register with a second operand of the first encoded instruction corresponding to a destination register; and
changing a bit in the first encoded instruction that indicates which operand corresponds to the source register and which operand corresponds to the destination register.

19. The method of claim 18, wherein the one or more alternative encoded instructions is semantically equivalent to the first encoded instruction.

20. At least one non-transitory machine readable storage medium comprising code for execution that when executed by one or more processors, causes the one or more processors to:
obtain a first encoded instruction of a software program, the first encoded instruction including a first opcode to be performed when the first encoded instruction is executed;
identify a first vulnerable value in a location within the first encoded instruction, wherein the first vulnerable value includes a second opcode;
identify an action to be performed to generate a second encoded instruction that does not contain the second opcode;
send a feedback signal to a compiler component based on the identified action, the feedback signal indicating the action to be performed;
obtain a third encoded instruction of the software program including a third opcode to be performed when the third encoded instruction is executed;
identify a second vulnerable value within the third encoded instruction, wherein the second vulnerable value includes a fourth opcode; and
replace the third encoded instruction with one or more alternative instructions that do not contain the second vulnerable value, by:
swapping a first operand of the third encoded instruction corresponding to a source register with a second operand of the third encoded instruction corresponding to a destination register; and
changing a bit in the third encoded instruction that indicates which operand corresponds to the source register and which operand corresponds to the destination register.

21. The at least one non-transitory machine readable storage medium of claim 20, wherein the action is to be performed on an intermediate representation (IR) of the first encoded instruction.

22. The at least one non-transitory machine readable storage medium of claim 20, wherein the feedback signal is sent to the compiler component based, at least in part, on determining that a feedback threshold has not been satisfied.

23. The at least one non-transitory machine readable storage medium of claim 20, wherein the action is identified based, at least in part, on the location of the first vulnerable value within the first encoded instruction.

* * * * *